(12) United States Patent
Page et al.

(10) Patent No.: US 12,139,256 B1
(45) Date of Patent: Nov. 12, 2024

(54) LONG RANGE FREIGHTER AIRCRAFT

(71) Applicant: JETZERO, INC., Long Beach, CA (US)

(72) Inventors: Mark Allan Page, Long Beach, CA (US); Blaine Knight Rawdon, Long Beach, CA (US); John Charles Vassberg, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/243,229

(22) Filed: Sep. 7, 2023

(51) Int. Cl.
| | |
|---|---|
| *B64C 39/10* | (2006.01) |
| *B64C 1/22* | (2006.01) |
| *B64C 25/18* | (2006.01) |
| *B64D 9/00* | (2006.01) |
| *B64D 11/00* | (2006.01) |

(52) U.S. Cl.
CPC ............... *B64C 39/10* (2013.01); *B64C 1/22* (2013.01); *B64C 25/18* (2013.01); *B64D 9/003* (2013.01); *B64D 11/0023* (2013.01); *B64C 2039/105* (2013.01); *B64D 2009/006* (2013.01)

(58) Field of Classification Search
CPC .......... B64C 39/10; B64C 1/22; B64C 25/18; B64C 2039/105; B64D 9/003; B64D 11/0023; B64D 2009/006
See application file for complete search history.

(56) References Cited

U.S. PATENT DOCUMENTS

| | | | |
|---|---|---|---|
| 7,344,109 B1 * | 3/2008 | Rezai .................. | B64D 11/00 244/118.6 |
| 8,366,050 B2 * | 2/2013 | Odle .................... | B64C 1/22 244/119 |
| 10,384,796 B2 | 8/2019 | Alexander | |
| 10,696,378 B2 | 6/2020 | Princen | |
| 2007/0040066 A1 * | 2/2007 | McCoskey ........... | B64F 1/31 244/137.1 |
| 2011/0121130 A1 * | 5/2011 | Odle .................... | B64C 1/22 244/36 |
| 2017/0240283 A1 * | 8/2017 | Dowty ................. | B64D 11/0604 |
| 2019/0118932 A1 * | 4/2019 | Princen ............... | B64C 9/00 |

FOREIGN PATENT DOCUMENTS

| | | | |
|---|---|---|---|
| JP | 5011613 B2 * | 8/2012 | |
| JP | 6606639 B2 | 11/2019 | |

* cited by examiner

*Primary Examiner* — Valentina Xavier
(74) *Attorney, Agent, or Firm* — Caldwell Intellectual Property Law

(57) ABSTRACT

A freighter aircraft for long-distance travel, the freighter aircraft comprising a blended wing body having a main body, a transition, and wings with no clear demarcation between the wings and the main body along a leading edge of the freighter aircraft, at least a propulsor, the at least a propulsor attached to a portion of the main body and configured to propel the freighter aircraft through air, a fuel storage located within the blended wing body, the fuel storage having a fuel capacity wherein the fuel capacity is configured for long-range flight, and a cargo bay located within the main body; the cargo bay configured to have a freighter capacity, wherein freighter aircraft is a long-range aircraft, the freighter aircraft including a ton-miles per sortie between 135,000 and 450,000.

20 Claims, 7 Drawing Sheets

LONG RANGE FREIGHTER AIRCRAFT

FIELD OF THE INVENTION

The present invention generally relates to the field of aircraft. In particular, the present invention is directed to a freighter aircraft having a blended wing body.

BACKGROUND

Tube and wing freighter aircraft are limited in volume and range due to inefficiencies in design and cabin layout. In addition, tube and wing aircraft must burn more fuel due to drag and inefficiencies in design.

SUMMARY OF THE DISCLOSURE

In an aspect, a freighter aircraft for long-distance travel is described. Freighter aircraft includes a blended wing body having a main body, a transition, and wings with no clear demarcation between the wings and the main body along a leading edge of the freighter aircraft. Freighter aircraft further includes a fuel storage located within the blended wing body, the fuel storage having a fuel capacity wherein the fuel capacity is configured for long-range flight, and a cargo bay located within the main body, the cargo bay configured to have a freighter capacity, wherein the freighter aircraft is long-range flight including a ton-miles per sortie between 135,000 and 450,000.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for freighter aircrafts for long distance travel. In an embodiment, freighter aircraft may include at least a propulsor, a fuel storage, and a cargo bay. In another embodiment, cargo bay may be configured to hold passengers. In another embodiments, freighter aircraft may include more than one deck wherein passengers are held above cargo.

Aspects of the present disclosure can be used to transport cargo and/or passengers over long distances. Exemplary embodiments illustrating aspects of the present disclosure are described below in the context of several specific examples.

Figure 1:
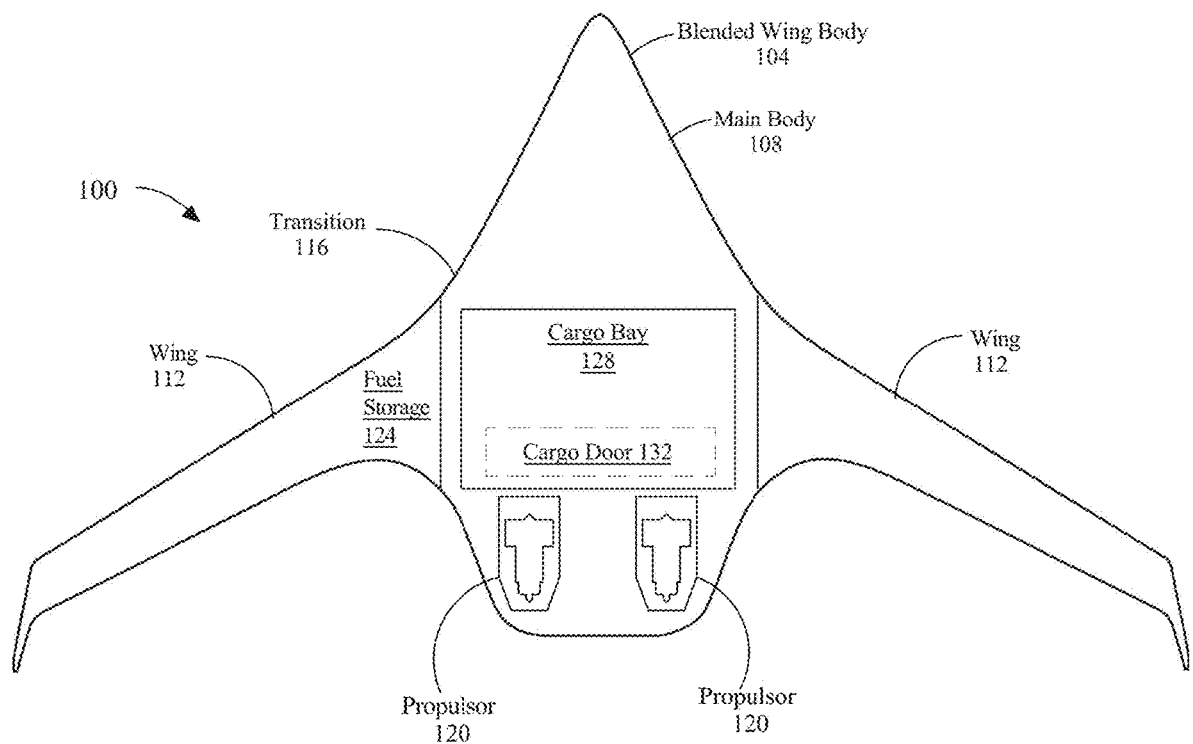
FIG. 1 is an illustration showing a schematic diagram of an exemplary embodiment of a freighter aircraft in accordance with one or more embodiments of the present disclosure.

Referring now to FIG. 1, a schematic diagram of an exemplary embodiment of a freighter aircraft 100 for long distance travel is illustrated. Freighter aircraft 100 includes a blended wing body 104. As used in this disclosure, A "blended wing body" (also referred to as a "BWB", a "blended body", or a "hybrid wing body" (HWB) in this disclosure), is a fixed-wing aircraft body having no striking demarcation between wings 112 and a main body 108 of the aircraft along a leading edge of the aircraft. "Main body" as described herein refers to any interior volume within an aircraft in which passengers, freight, cargo and/or fuel may be stored. In some cases, main body 108 may refer to a fuselage of the aircraft. Blended wing body 104 includes a main body 108, a transition 116, and wings 112 with no clear demarcation between wings 112 and main body 108 along a leading edge of freighter aircraft 100. As used in this disclosure, a "freighter" or "freighter aircraft 100" is an aircraft configured to store, transport, and/or offload cargo. In some cases, freighter aircraft 100 may be used to offload cargo during an aerial flight. Freighter aircraft 100 may include a special purpose aircraft. For the purposes of this disclosure, a "special purpose aircraft" is an aircraft used for a particular, designated purpose. A special aircraft may include a military or civilian aircraft having a particular role, such as a freighter, tanker, and the like, as discussed further in this disclosure.

With continued reference to FIG. 1, BWB 104 and/or freighter aircraft 100 may include two wings 112. As used in this disclosure, "wings" are components of an aircraft configured to generate lift as a function of dynamic pressure and angle of attack. Each wing may be distally located laterally on freighter aircraft 100 such that, for example, a most distal part of each wing may represent a most distal part of freighter aircraft 100. In one or more embodiments, freighter aircraft 100 and/or blended wing body 104 may include two transition 116s. As used in this disclosure, a "transition" of a blended wing body 104 is a portion of a blended wing body 104 between wing and main body 108.

With continued reference to FIG. 1, freighter aircraft 100 includes at least a propulsor 120, propulsor 120 attached to a portion of main body 108 and configured to propel freighter aircraft 100 through air. As used in this disclosure, a "propulsor" is any system or device configured to generate thrust in a fluid medium. For example, propulsor 120 may include a fan, propellor, rotor, and the like. In some cases, a propulsor 120 may include one or more components of an engine (e.g., jet engine) and a motor (e.g., electric motor). Propulsor 120 may include any propulsion system, propulsor 120, engine, or motor described in this disclosure. In one or more embodiments, propulsor 120 may include an engine fueled by more than one fuel. Alternatively or additionally, in some embodiments, propulsor 120 may include a motor powered by electricity. In some cases, electricity may be derived from a fuel storage 124 as described in this disclosure. For example, in some cases, electricity may be generated from one or more of a generator, alternator or the like. Alternatively or additionally, in some cases, electricity may be produced by a fuel cell. In some embodiments, propulsor 120 may include an electric motor. Electric motor may be powered by one or more electricity sources, such as without limitation batteries and/or fuel cells. Additional disclosure related to fuel cell technology may be found in U.S. patent application Ser. No. 17/478,724, titled "BLENDED WING BODY AIRCRAFT WITH A FUEL CELL AND METHOD OF USE," filed on Sep. 17, 2021, and incorporated by reference, in its entirety, within this disclosure. In some cases, a fuel cell may provide steady state power to propulsor 120, such as for example, for cruise flight. Alternatively or additionally, a battery or another electricity source may provide supplemental power for climbing. In some cases, fuel cell may be configured to charge battery or another electricity source, when it produces excess power, for example during descent or ground operations. In one or more embodiments, propulsor 120 may include at least a propulsor 120 mechanically affixed to freighter aircraft 100. In some cases, at least a propulsor 120 may be configured to propel freighter aircraft 100. In some embodiments, at least a propulsor 120 may include at least an electric motor operatively connected with fuel cell. Alternatively or additionally, propulsor 120 may be powered by one or more batteries. Batteries may include any batteries described in this disclosure. Propulsor 120 may be operatively connected to fuel cell by way of electrical communication, for example through one or more conductors. In some cases, at least a fuel cell may be configured to power at least an electric motor of propulsor 120. In some embodiments, at least a propulsor 120 may include both a combustion engine and an electric motor. In some embodiments, at least a propulsor 120 may be attached to an upper aft surface of main body 108. As described herein an "aft surface" refers to a surface near the of the aircraft wherein the rear signifies the tail of the aircraft. An "upper aft surface" as described herein refers to the upper rear surface of an aircraft, wherein the propulsor 120 may be placed on or above the rear surface.

With continued reference to FIG. 1, freighter aircraft 100 includes a fuel storage 124 located within blended wing body 104. As described in this disclosure, a "fuel storage" is an aircraft component configured to store a fuel. In some cases, fuel storage 124 may include a fuel store. "Fuel store" as defined herein refers to an enclosed compartment used to store fuel. In some embodiments, fuel storage 124 may include a plurality of fuel stores. In some cases, fuel storage 124 may include a plurality of fuel stores, wherein each of the fuel store contains the same or substantially different fuel. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. Fuel storage 124 is located substantially within blended wing body 104 of freighter aircraft 100. For example, and without limitation, within a wing portion of blended wing body 104. Aviation fuels may include petroleum-based fuels, or petroleum and synthetic fuel blends, used to power freighter aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for freighter aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite. In some cases, fuel storage 124 may be located on a lower portion of main body 108 108. In some cases, fuel storage 124 may be located within transition 116, wherein transition 116 increases in chord and average thickness from wings 112 in a direction of main body 108. "Chord" as described herein refers to a length of a wing and/or transition 116 measured along a straight line from a leading edge to a trailing edge. At a wing tip, the chord may be smaller whereas closer the main body 108, the chord may be larger. "Thickness," as defined herein refers to the thickness of wing from a lower surface to an upper surface of the wing. Thickness of wing may increase from wing tip in a direction of main body 108. Thickness may vary along the chord line of a wing. Additionally or alternatively, fuel storage 124 may be located in wings 112.

With continued reference to FIG. 1, fuel storage 124 may include an insulated wall. As used in this disclosure in a thermal context, an "insulated wall" is any structure configured to restrict, slow, minimize, or otherwise limit a flow of heat. In some cases, an insulated wall may include a hermetically sealed portion, through which heat transfer by convection is limited. For example, in some cases an insulated wall may include a hermetically sealed portion containing one or more of a vacuum and gas having a low heat transfer properties (e.g., argon, krypton, and the like). As used in this disclosure, a "vacuum" is a pressure below that of the cabin pressure. Alternatively, or additionally, in some cases, insulated wall may include insulation. As used in this disclosure in a thermal context, "insulation" is any material that restricts, slows, minimizes, or otherwise limits a flow of heat. Insulated wall and insulation may include any thermal insulation means described in this disclosure. Additional disclosure related to a fuel storage 124 may be found in U.S. patent application Ser. No. 17/672,829 title "BLENDED WING BODY 104 AIRCRAFT WITH A FUEL CELL AND METHOD OF USE," filed on Feb. 16, 2022, and incorporated by reference, in its entirety, within this disclosure.

With continued reference to FIG. 1, fuel storage 124 includes a fuel capacity. "Fuel capacity" as described in this disclosure refers to a quantity of fuel that can be stored in fuel storage 124. Fuel capacity may be represented as an overall fuel capacity wherein the overall fuel capacity is quantified in liters, pounds, kilograms, gallons or the like. Fuel capacity may further be represented as a range of distance wherein the fuel capacity is representative of the distance freighter aircraft 100, or another aircraft can travel.

For example, fuel capacity may include an 8,000 nautical mile capacity wherein the quantity of fuel within fuel storage 124 can power freighter aircraft 100 up to 8,0000 nautical miles (nm). Fuel capacity may further be quantified in time, wherein fuel capacity represents the amount of time freighter aircraft 100 can travel. For example, fuel capacity may include a capacity of 8 hours wherein freighter aircraft 100 can travel for a maximum of 8 hours. In some cases, fuel storage 124 may contain a maximum capacity of 20,000 gallons of fuel. In some cases, fuel storage 124 contains a maximum capacity of 30,000 gallons of fuel. In some cases, fuel storage 124 124 contains a maximum capacity of 40,000 gallons of fuel. In some cases, fuel capacity may vary wherein the fuel capacity varies based on a maximum payload on the aircraft. For example, fuel storage 124 124 may have a fuel capacity of 5000 nautical miles (nm) with one payload and a fuel capacity of 4,000 nm for another heavier payload.

With continued reference to FIG. 1, fuel capacity is configured for long-range flight. "Long-range flight" as described in this disclosure is the ability to travel distances of at least 4,000 nm, without the need to stop and refuel. Maximum flight distance may be a function of payload weight. That is, as a non-limiting example, maximum flight distance may decrease as payload weight increases. In some cases, long range flight may include a maximum flight distance of 13,000 nautical miles. In some cases, long range flight may include a maximum flight distance of 4,000 to 10,000 nautical miles. In some cases, long range flight may include a maximum flight distance of 4,000 to 6,000 nautical miles. In some cases, long range flight may include a maximum flight distance of 11,000 nautical miles. Long range flight may be suitable for instances in which an aircraft seeks to travel a long distance without having to stop over to refuel. For example, a military aircraft traveling over a foreign country may seek to travel over the country without having to stop and refuel. Long-range flights may decrease a flight duration due to the aircraft capabilities to travel long distances without having to stop. In some embodiments, long-range flight may refer to an aircraft capable of traveling between two countries. Long range flight may include a maximum flight distance of between 5000 and 8000 nautical miles. In some embodiments, long-range flight may include a maximum payload range wherein the maximum payload range is a maximum range of freighter aircraft 100 when a maximum payload is present on freighter aircraft 100. As a non-limiting example, freighter aircraft 100 may include a maximum payload range of 4,5000 nm at a maximum payload of 120,000 lbs. In some embodiments, freighter aircraft 100 may include a maximum payload rang of 4,800 nautical miles at a max payload of 120,000 lbs. In some embodiments, long-range flight may include a maximum flight distance of 9000 nautical miles. In some cases, freighter aircraft 100 contains a maximum flight distance of 9000 nautical miles. In some embodiments, long range flight may include a minimum flight duration of 8 hours. Fuel capacity may be configured for long-range flight such that fuel capacity contains enough fuel for an aircraft to travel a maximum of 8,0000 nautical miles. Additionally, or alternatively, fuel capacity may be configured for long-range flight such that freighter aircraft 100 can travel at least 8 hours without having to stop and refuel. In some embodiments, long range flight may include a minimum flight duration of 12 hours. In some embodiments, freighter aircraft 100 configured for long range flight includes freighter aircraft 100 having an auxiliary power unit. "Auxiliary power unit (APU)" as described herein refers to an electrical generating device that provides energy to an aircraft without the use of an aircraft engine. APU may include a small turbine engine in which the APU generates energy through the combustion of air and fuel. APU may power various sections of commercial aircraft such as air conditioning, lighting and the like. APU may be used to provide electrical power when power cannot be generated through an engine of freighter aircraft 100. APU may further be utilized to start an engine of freighter aircraft 100. In some embodiments, APU may be used when an aircraft is not in motion. APU may reduce fuel consumption by powering various components of freighter aircraft 100 in place of an engine powering the components. APU may be located on a rear surface of freighter aircraft 100. In some embodiments, APU may be located in a nacelle of freighter aircraft 100.

With continued reference to FIG. 1, freighter aircraft 100 includes a cargo bay 128 located within main body 108. "Cargo bay" also referred to as a "cargo hold" or a "cargo store," as described herein, is an area within main body 108 or a fuselage configured to hold a cargo. Cargo bay 128 may further include at least a portion of an interior cavity of main body 108. Cargo may include luggage, military equipment, goods, unit load devices, or any other movable products. In some embodiments, cargo bay 128 may be located in a portion of transition 116 portion in blended wing body 104. BWB 104 may further be configured with cargo systems. Exemplary cargo systems may include without limitation one or more cargo compartments, cargo restraining means (e.g., cargo floor with rollers, rails, locks and the like), a forward cargo barrier (configured to protect pilots and crew), cargo doors and openings (configured to permit cargo to be loaded, distributed within the airplane, and unloaded), and the like.

With continued reference to FIG. 1, cargo bay 128 may include a load floor wherein load floor refers to a lower surface of cargo bay 128 configured to hold cargo. Load floor may include a material such as aluminum, steel, a carbon fiber material, or a similar material capable of withstanding heavy cargo. In some embodiments, a post may act similarly to stringer in that it is configured to support axial loads in compression due to a load being applied parallel to its axis due to, for example and without limitation, a heavy object being placed on load floor of freighter aircraft 100. A beam may be disposed in or on any portion of main body 108 of aircraft that requires additional bracing, specifically when disposed transverse to another structural element, like a post, which would benefit from support in that direction, opposing applied force. A beam may be disposed in a plurality of locations and orientations within a main body 108 as necessitated by operational and constructional requirements. In some cases, load floor may include rollers. "Rollers" as described herein are a set of wheels, or similar spherical or cylindrical components capable of rotating along an axis that allow easier movement of a cargo along cargo bay 128. Cargo may be placed directly on top of rollers, wherein a force applied to cargo will cause rollers to rotate and move cargo along cargo bay 128. Rollers may allow a user to push/roll a cargo across cargo bay 128. Rollers allow for a decrease in frictional force with load floor such that a user can push cargo along rollers to allow for easier movement of cargo. In some embodiments, rollers may be partially located in a load floor recess. In some embodiments, rollers may include electric rollers. Electric rollers sometimes known as "powered rollers" are electrically driven rollers powered by a drive motor. Electric rollers allow a user to move cargo into and along cargo bay 128 without having to manually move or push the cargo. Electric rollers further allow a user to move heavier cargo in which an ordinary user may not be able to do so on their own. Cargo bay 128 further include a roller track wherein roller track includes a plurality of rollers located on load floor wherein cargo may be pushed along roller track to a designated area of cargo bay 128. Rollers may further retract below floor level of load floor such that a cargo is no longer in contact with roller. A user may wish to retract rollers into floor when a cargo has reached its designated location within cargo bay 128. Rollers may retract into floor using pneumatic rollers. Pneumatic rollers as defined herein are rollers powered by a pressurized air or gas. Pneumatic rollers may be lifted from below the ground such that a portion of rollers is above a surface of load floor. Additionally or alternatively, pneumatic rollers may descend into load floor such that an entirely of rollers is located beneath a surface of load floor.

With continued reference to FIG. 1, cargo bay 128 may include a plurality of tie down rings. "Tie down rings," sometimes known as D-rings, as described herein, are rings attached to load floor that may be used to hold a cargo in place. Tie down rings may be screwed, welded, removably attached, or attached in any other manner to load floor. Tie down rings may be a ring made of a metal such as steel, aluminum or a metal alloy. Tie down rings may further include a carbon fiber material similar to a carbon fiber material as described in this disclosure. Cargo may be held in a fixed position using tie down ring. Cargo may be held in a fixed positions using rope or straps, wherein the ropes are straps are strapped around cargo and tied or connected to tie down rings. Tie down rings may be removably attached to a floor of cargo bay 128. In some embodiments, tie down ring may be removably attached from load floor of cargo bay 128. In some cases, cargo bay 128 may include one or more cargo locks. A "Cargo lock" for the purposes of this disclosure is a mechanism used to secure cargo in place within a cargo bay. Cargo locks may include floor tracks wherein a container within slide onto the floor track wherein the container may be restrained laterally and restrained from any upwards movement. In additions, the floor tracks and/or the containers may contain additional locks in order to prevent longitudinal motion along the tracks. In some cases, the floor tracks may be configured for ease of movement of a container within a cargo bay. In some cases, a container may slide along a floor track to a desired portion prior to locking the container in place. In some cases, cargo lock may further include latch lock mechanisms, fittings buckles, tie down rings and the like. In some cases, cargo lock may further include locking pins configured to lock onto a container wherein the container may be restrained from movement within an aircraft.

| Parameter | Minimum (exemplary values) | Freighter Aircraft 100 (exemplary values) | Maximum (exemplary values) |
| --- | --- | --- | --- |
| Max Payload Weight (lbs) | 90,000 | 120,000 | 150,000 |
| Range @ Max Payload (nmi) | 3000 | 4,780 | 6000 |
| MTOGW (lb) | 240,000 | 390,000 | 620,000 |
| Ton-Miles per Sortie (TMS) | 135,000 | 286,800 | 450,000 |
| Total Cargo Volume (cu-ft) | 7500 | 17,700 | 25,000 |
| Takeoff Field Length (ft) | 4000 | 8,400 | 12,000 |
| Fuel Burn (lbs per Ton-nmi) | 0.288 | 0.3 | 0.391 |
| Primary M1 Containers | 10 | 14 | 38 |
| Additional LD-3 Containers | 8 | 16 | 20 |
| Total length (ft) | 90 | 114 | 160 |
| Ground span (ft) | 116 | 116 | 262 |

With continued reference to FIG. 1, in some embodiments, freighter aircraft 100 may include a maximum payload weight of 100,000 to 160,000 lbs. In some embodiments, freighter aircraft 100 may include a maximum payload weight of 110,000 to 140,000 lbs. In some embodiments, freighter aircraft 100 may include a maximum payload weight of 90,000 to 150,000 lbs. In some embodiments, freighter aircraft 100 may include a maximum payload weight of 110,000 to 130,000 lbs. In some embodiments, freighter aircraft 100 may include a maximum payload weight of 120,000 lbs. In some embodiments, freighter aircraft 100 may include a range at maximum payload of 3,000 to 6,000 nmi. In some embodiments, freighter aircraft 100 may include a range at maximum payload of 4,000 to 5,000 nmi. As a non-limiting example, freighter aircraft 100 may include a range at maximum payload of 4,780 nmi. As a non-limiting example, freighter aircraft 100 may include a range at maximum payload of 4,000 nmi. As a non-limiting example, freighter aircraft 100 may include a range at maximum payload of 5,000 nmi. In some embodiments, freighter aircraft 100 may include a MTOGW of 250,000 to 400,000 lbs. In some embodiments, freighter aircraft 100 may include a MTOGW of 300,000 to 350,000 lbs. As a non-limiting example, freighter aircraft 100 may include an MTOGW of 317,563 lbs. As a non-limiting example, freighter aircraft 100 may include an MTOGW of 350,000 lbs. In some embodiments, freighter aircraft 100 may include a ton-miles per sortie of 200,000 to 320,000. For the purposes of this disclosure, "ton-miles per sortie" is a measure ton-miles per mission. A "ton-mile," for the purposes of this disclosure, is a measurement representing one ton of freight shipped one mile. In some embodiments, freighter aircraft 100 may include a ton-miles per sortie of 210,000 to 320,000. In some embodiments, freighter aircraft 100 may include a ton-miles per sortie of 250,000 to 300,000. In some embodiments, freighter aircraft 100 may include a ton-miles per sortie of 275,000 to 300,000. As a non-limiting example, freighter aircraft 100 may include a ton-miles per sortie of 317,563. As a non-limiting example, freighter aircraft 100 may include a ton-miles per sortie of 350,000. In some cases, freighter aircraft 100 may include a ton-miles per sortie of between 135,000 and 450,000. In some embodiments, freighter aircraft includes a total cargo volume of 16,000 to 20,000 cu-ft. In some embodiments, freighter aircraft 100 includes a total cargo volume of 17,000 to 19,000 cu-ft. In some embodiments, freighter aircraft 100 includes a total cargo volume of 17,000 to 18,000 cu-ft. As a non-limiting example, freighter aircraft 100 includes a total cargo volume of 17,700 cu-ft. As a non-limiting example, freighter aircraft 100 includes a total cargo volume of 18,000 cu-ft. In some embodiments, freighter aircraft 100 may include a takeoff field length of 7,000 to 9,000 ft. In some embodiments, freighter aircraft 100 may include a takeoff field length of 8,000 to 9,000 ft. As a non-limiting example, freighter aircraft 100 may include a takeoff field length of 8,400 ft. In some embodiments, freighter aircraft 100 includes a fuel burn of 0.2-0.8 lbs per ton-nmi. "Fuel burn," for the purposes of this disclosure, is a measure of the average fuel burned in weight for a cargo weight and distance. In some embodiments, freighter aircraft 100 includes a fuel burn of 0.2-0.6 lbs per ton-nmi. In some embodiments, freighter aircraft 100 includes a fuel burn of 0.2-0.4 lbs per ton-nmi. As a non-limiting example, freighter aircraft include a fuel burn of 0.262 lbs per ton-nmi. As a non-limiting example, freighter aircraft include a fuel burn of 0.4 lbs per ton-nmi. In some embodiments, freighter aircraft 100 may have the capacity to carry 12-16 primary M1 containers. In some embodiments, freighter aircraft 100 may have the capacity to carry 13-16 primary M1 containers. In some embodiments, freighter aircraft 100 may have the capacity to carry 13-15 primary M1 containers. As a non-limiting example, freighter aircraft 100 may have a capacity to carry 14 M1 containers. In some embodiments, freighter aircraft 100 may have the capacity to carry 1-16 LD3 containers. In some embodiments, freighter aircraft 100 may have the capacity to carry 10-16 LD3 containers. In some embodiments, freighter aircraft 100 may have the capacity to carry 10-12 LD3 containers. As a non-limiting example, freighter aircraft 100 includes capacity to carry 10 LD3 containers. As a non-limiting example, freighter aircraft 100 includes capacity to carry 16 LD3 containers. In some embodiments, freighter aircraft include capacity to carry 10-16 M1 containers and 5-16 LD-3 containers. In some embodiments, freighter aircraft 100 include capacity to carry 10-16 M1 containers and 10-16 LD-3 containers. In some embodiments, freighter aircraft 100 include capacity to carry 12-15 M1 containers and 10-16 LD-3 containers. In some embodiments, freighter aircraft 100 include capacity to carry 12-15 M1 containers and 10-14 LD-3 containers. In some embodiments, freighter aircraft 100 include capacity to carry 13-15 M1 containers and 10-14 LD-3 containers. As a non-limiting example, freighter aircraft 100 may include capacity to carry 14 M1 containers and 16 additional LD-3 containers. In some embodiments, freighter aircraft 100 includes a total length of 100 to 160 ft. In some embodiments, freighter aircraft 100 includes a total length of 110 to 140 ft. In some embodiments, freighter aircraft 100 includes a total length of 110 to 120 ft. As a non-limiting example, freighter aircraft 100 may include a total length of 114 ft. As a non-limiting example, freighter aircraft 100 may include a total length of 130 ft. In some embodiments, freighter aircraft 100 may include a ground span of 100-160 ft. In some embodiments, freighter aircraft 100 may include a ground span of 110-140 ft. In some embodiments, freighter aircraft 100 may include a ground span of 110-120 ft. As a non-limiting example, freighter aircraft 100 includes a ground span of 116 ft. As a non-limiting example, freighter aircraft 100 includes a ground span of 130 ft.

With continued reference to FIG. 1, cargo bay 128 includes a freighter capacity. "Freighter capacity" as described herein refers to a cargo capacity similar to that of a freighter aircraft 100, wherein freighter capacity has a minimum capacity of 20 metric tons. In some embodiments, freighter capacity has a maximum capacity of 120,000 lbs. In some embodiments, freighter capacity may be substantially proportional to surface area of load floor, or similarly on a surface in which cargo may rest due to gravity. Freighter capacity may include a minimum or maximum cargo weight limit, wherein the weight limit is quantified in metric tons, pounds, or any other suitable unit of measurement. In some embodiments, freighter capacity includes a maximum freighter capacity of 41 metric tons. Freighter capacity may further include a cargo dimension capacity. "Cargo dimension capacity" as described herein refers to the maximum dimensions of a cargo that may fit within cargo bay 128. Cargo dimension capacity may include a maximum cargo height of 96 inches. Cargo dimension capacity may further include a maximum cargo length of 125 inches. Cargo dimension capacity may further include a maximum cargo width of 96 inches. In some embodiments cargo dimension capacity contains a maximum capacity similar to that of an M1 container. In some embodiments cargo dimension capacity contains a maximum capacity similar to that of an 43 L pallet. In some embodiments, cargo capacity contains a maximum capacity of 20 463 L pallets. In some embodiments, cargo dimension capacity contains a maximum capacity suitable to hold 14 primary M1 containers and 16 LD-3 containers. In other nonlimiting embodiments, the overall freighter capacity of freighter aircraft 100 may include at least a portion of a surface area of load floor. Cargo bay 128 may include a volumetric space used for cargo storage. In one or more embodiments, a volumetric space may include at least a portion of a width w of interior cavity, a height h of interior cavity, and a length/of interior cavity. In various embodiments, a width w' of interior cavity may run parallel to a lateral axis of freighter aircraft 100 that extends wing-to-wing of a BWB 104 of freighter aircraft 100. In various embodiments, a height h of interior cavity may extend from a surface of load floor to a ceiling of freighter aircraft 100, such as toward a skin of freighter aircraft 100. In various embodiments, a length/of interior cavity may run along a longitudinal axis of freighter aircraft 100 that extends nose-to-tail of freighter aircraft 100. In one or more embodiments, cargo density of freighter aircraft 100 may include a range of 6 lb/ft³-11 lb/ft³. Cargo bay 128 may be configured to include receptacles for fuel tanks, batteries, fuel cells, or other energy sources as described in this disclosure. In one or more nonlimiting embodiments, M1 containers may be oriented 125" wide, 96" long and 96" high. In various embodiments, interior cavity may include a useable height (e.g., ceiling height h) set to accommodate 96-inch height throughout the bay or cabin and in structural openings to permit lateral and longitudinal motion of containers. In one or more embodiments, height h of interior cavity may include a total height of a height of a lower portion and a total height of upper portion. In nonlimiting embodiments, height h may include ceiling height, which includes a distance from a base, such as load floor, to interior surface of an upper skin of an airframe of freighter aircraft 100. In some embedment's, freighter capacity may be quantified as a maximum cargo wherein the maximum cargo volume is the maximum volume in which cargo can be stored. Maximum cargo volume may include a maximum volume of 17,700 cubic feet. In some embodiments, Maximum cargo volume may contain a maximum volume of 18,000 cubic feet.

With continued reference to FIG. 1, Freighter capacity may be dependent and/or proportional on a flight distance of freighter aircraft 100 within a given range. For example, when a Freighter capacity has a maximum cargo capacity of 120,000 lbs, freighter aircraft 100 may contain a maximum, flight distance of 4,780 nautical miles. In another non-limiting example, freighter capacity may have a maximum cargo capacity of 50,000 lbs wherein freighter aircraft 100 contains a maximum flight distance of 11,000 nautical miles. In some cases, freighter aircraft 100 contains a maximum flight distance of 13,000 miles wherein freighter aircraft 100 may contain a smaller weight limit for transporting cargo. In some embodiments, freighter aircraft 100 may be mass and range constrained wherein a particular payload may constrain the range of the aircraft. For example, freighter aircraft 100 may be mass/range constrained wherein an aircraft having a full payload may only travel half as far as an aircraft having a payload having half of full payload weight.

With continued reference to FIG. 1, cargo bay 128 may further include an insulated wall. Insulated wall includes any insulated wall described in this disclosure. Insulated wall may be used to insulate an interior or cargo bay 128 such that cargo bay 128 contains a differing temperature than the surrounding atmosphere. For example, insulated wall may contain heat generated within cargo bay 128 such that passengers and/or cargo are kept properly warm during a flight. Similarly insulated wall may keep an interior of cargo bay 128 refrigerated such that cargo bay 128 can transport perishable goods.

With continued reference to FIG. 1, cargo bay 128 may be configured to hold passengers. Additionally or alternatively main body 108 may be configured to hold passengers. Configuring cargo bay 128 and/or main body 108 to hold passengers may include cargo bay 128 and/or main body 108 having passenger seats, passenger bathrooms, passenger storage compartments and the like. Additionally, or alternatively, cargo bay 128 may include a passenger compartment. "Passenger compartment" as described herein refers to an area within cargo bay 128 and/or main body 108 that may be used to house passengers during an aerial flight. Passenger compartment may include a sitting area, wherein sitting area includes one more seats. "Sitting area," as described herein, refers to any area within an aircraft which is configured for a passenger to sit in. Sitting area may include seats within a passenger compartment located in the fuselage. Sitting aera may further include seats within a carbon bay configured to sit passengers. Sitting area may be used for passengers to sit during a flight. Seats in sitting area may be removably attached to load floor of cargo bay 128. Passenger compartment may further include a sleeping area, wherein sleeping area may comprise one or more bunks. "Sleeping area," as defined herein, refers to any area within an aircraft that is configured to allow for a passenger to sleep. This may include a passenger compartment, a cargo bay 128 having seats or beds, a crew rest area, a rest area within passenger compartment and the like. Passenger compartment may further include a partitioning wall, wherein the partitioning wall is configured to at least partially physically divide the sitting area and the sleeping area. Passenger area and/or compartment is described in further detail below in FIGS. 5A-5B. Additional disclosure related to passenger compartment may found in U.S. patent application Ser. No. 18/101, 836 titled "BLENDED WING BODY AIRCRAFT WITH A PASSENGER COMPARTMENT," filed on Jan. 23, 2023, incorporated by reference, in its entirety, within this disclosure. In some cases, passenger compartment may be removably attached to cargo bay 128. For example, on or more seats in sitting area may be removably attached to load floor such that cargo may be placed in lieu of one or more seats. Additionally or alternatively, passenger compartment may be removably attached to cargo bay 128 such that a plurality of passenger amenities may be removably attached to cargo bay 128. Plurality of passenger amenities may include passenger bathrooms, passenger seats and the like. Additionally or alternatively partitioning wall may be removably attached to cargo bay 128. Partitioning wall may be removably attached such that portioning wall may be removed to place cargo. In some embodiments, cargo bay 128 may comprise a maximum passenger capacity of between 250 and 300 passengers. In some cases, cargo bay may comprise a maximum passenger capacity of between 175 and 350 passengers. Additionally, or alternatively, passenger compartment may comprise a maximum 250 to 350 passenger seats.

With continued reference to FIG. 1, main body 108 may have a single deck, wherein the passengers and cargo are both located on or above the single deck. (i.e., single passenger and cargo floor). A "single deck" for the purposes of this disclosure, refers to a flat deck within the interior of an aircraft. This may be contrasted with a tube and wing aircraft having cargo and/or a cargo compartment beneath the deck of the aircraft. Single deck may represent the floor of cargo bay 128. In some cases, cargo may be placed within cargo bay 128 which may be located atop single deck. In some cases, a cargo compartment may be located on single deck. Single deck may serve as the contiguous wall between cargo bay 128 and another portion of freighter aircraft 100. The term "contiguous" means the bottom surface of cargo bay 128 and the bottom of freighter aircraft 100 share at least a common border. Passenger compartment may be contained within the space on either side or both sides of cargo bay 128. In some embodiments, cargo and one or more passengers are located on or above single deck. Cargo bay 128 be located on single deck wherein cargo bay holds cargo. Additionally or alternatively passenger compartment may be located within cargo bay 128 wherein passenger compartment is located on or above single deck with cargo bay 128. In some embodiments, main body 108 may include more than one deck wherein one or more passengers are located above cargo. For example, main body 108 may include more than one deck wherein passengers are located on an upper deck and cargo bay 128 having cargo is located on a lower deck. A height h of cargo bay 128 may allow for a passenger compartment to be disposed within an upper portion of freighter aircraft 100 while still allowing for ample headspace for passengers. The size of passenger compartment relative to interior cavity may be based on requirements for passenger capacity versus cargo capacity. For example, and without limitation, if more cargo is required to be transported, then passenger compartment may only hold several passengers to allow for more storage of cargo.

Still referring to FIG. 1, cargo bay 128 may include cargo doors 132, which allow for traversing of cargo into and out of freighter aircraft 100. "Cargo door," as described herein, refers to entryways into cargo bay 128 in which cargo may be transferred through and into cargo bay 128. For example, Cargo bay 128 may include cargo doors 132 wherein flight personnel may open the cargo door 132 in order to place cargo into cargo bay 128. Cargo doors 132 of freighter aircraft 100 may be placed in various locations of BWB 104 of freighter aircraft 100 to allow for loading of cargo into freighter aircraft 100. For example, and without limitation, a main cargo door 132 of cargo bay 128 may be located on a left side of BWB 104 in alignment with the front row of M1 containers in main portion of interior cavity. This location may be behind and clear of a primary passenger door on the same side. In another example, and without limitation, a nose portion of freighter aircraft 100 may swing open to provide an opening, allowing for cargo to be moved into and out of cargo bay 128. In another example, and without limitation, cargo doors 132 may include openings disposed within main body 108 of freighter aircraft 100. In some cases, cargo bay 128 may contain cargo door 132, wherein cargo door 132 is located in a lower aft surface of main body 108. In some cases, cargo door 132 may be located on a leading edge of main body 108. A "lower aft surface" of main body 108 refers to a bottom portion of a rear surface of main body 108, wherein rear signifies a portion near the tail end of an aircraft. Lower aft surface may be situated under upper aft surface as described above. In one or more embodiments, freighter aircraft 100 may include cargo systems and/or devices, such as mechanisms used for loading and/or securing cargo within cargo bay 128 of freighter aircraft 100. For example, and without limitation, a cargo loading system may include a conveyor belt configured to move cargo from a first location (e.g., a location outside of main body 108) to a second location (e.g., a location inside of fuselage, such as interior cavity). In another example, and without limitation, a securing mechanism may include a strap or hook that a selectively secures cargo to an interior surface (e.g., floor, wall, ceiling, and the like) of cargo bay 128.

With continued reference to FIG. 1, freighter aircraft 100 may include a structural element located within main body 108. Structural element may extend vertically from a lower surface of main body 108 toward an upper surface of main body 108. "Structural element" as described in this disclosure is a weight bearing support that is configured to resist pressurization loads of the main body 108 and reduce skin bending loads. In some embodiments, structural element may include struts, beams, formers, stringers, longerons, interstitials, ribs, structural skin, straps, spars, or panels, to name a few. Structural element may also include pillars. Structural element may also consist of a wall extending along an interior of main body 108. Structural element may extend laterally or longitudinally along main body 108. Structural element may be made of aluminum, carbon fiber or a similar material suitable for aircrafts or high-pressure environments requiring lighter materials. In some embodiments, structural element includes a carbon fiber material as discussed in further detail in this disclosure. In some embodiments, structural element may contain a wall, wherein structural element splits main body 108 and/or cargo bay 128 into multiple bays. The wall may include a window or an opening such that a user may peer through the opening to view into another bay. In some embodiments, structural element connects the upper and lower skin structure to resist pressurization loads and to stabilize the skin in terms of buckling and core crushing. In some embodiments, structural element may extend from a first distal end of main body 108 towards a second distal end of main body 108. In some embodiments, structural element may be positioned along a central longitudinal axis. Additionally, or alternatively, structural element may contain a plurality of beams pillars or the like and concealed within a flat surface such as a wall. For example, similar to a house in which the beams of the house are concealed behind a plastered wall, structural element may be concealed within a wall. In some embodiments, structural element 1 may be a load bearing wall wherein the load bearing wall transfers a load to from an upper surface and lower surface of main body 108 into structural element. Structural element may include trusses wherein a load of the upper surface of main body 108 may be transferred to the trusses. In some embodiments, structural element may contain braces wherein the braces transfer a load from one surface to a second surface. In some embodiments, structural element may be configured to prevent core-crushing. "Core crushing" as defined in this disclosure is the process in which a vessel, primarily a hollow vessel, is crushed under high pressure conditions. Structural element may be configured to prevent core crushing by transferring loads due to high pressure into structural element. For example, a load applied to upper surface of main body 108 and a load applied to lower surface of main body 108 due to pressure differences may be transferred to structural element such that structural element contains the loads. Structural element may further be positioned along portions of main body 108 that cannot contain the loads applied onto main body 108. For example, structural element may be placed in a center of main body 108 wherein the center of main body 108 cannot contain a pressure vessel on its own.

With continued reference to FIG. 1, in some cases a portion of an outer skin surface of freighter aircraft 100 comprises a carbon fiber material. "Outer skin surface" for the purposes of this disclosure refers to an outer surface of freighter aircraft 100. In some embodiments, outer skin surface may be comprised of another material as well. As a non-limiting example, outer skin surface may be comprised of aluminum. Additionally or alternatively freighter aircraft 100 may further include a portion of wings 112 having carbon fiber material. For example, a portion of wings 112 such as an outer surface of wings 112 may have carbon fiber material wherein carbon fiber material is adhered to a top of a surface of wings 112. Additionally, or alternatively, portion of wings 112 containing carbon fiber material may include a section wherein wings 112 may be more prone to structural damage. For example, sections of wings 112 containing an increased amount of force in comparison to other sections may benefit from carbon fiber material. Carbon fiber material may be placed in only those sections in which enhanced structural rigidity is required such that freighter aircraft 100 does not carry any excess weight. In some embodiments, an entirety of wings 112 may have carbon fiber material. In some embodiments, wings 112 may be made of a mixture of carbon fiber material and another suitable material for aircraft such as aluminum. Additionally, or alternatively, an outer surface of wings 112 may have carbon fiber material. In some embodiments, wings 112 may not contain any carbon fiber material at all. In some embodiments, a portion of transition 116 may have carbon fiber material. Portion of transition 116 may include a section of transition 116. Portion of transition 116 may further include structurally fragile sections on transition 116. For example, carbon fiber material may be located around a window frame located on transition 116 such that carbon fiber material may be used to reinforce the window frame. Additionally, or alternatively, portion of transition 116 may include an outer surface of transition 116 wherein carbon fiber material is adhered to a surface of transition 116 in order to prevent structural damage. In some embodiments, an entirety of transition 116 may include carbon fiber material. In some embodiments an entirety of wings 112 contains carbon fiber material. Additionally, or alternatively an internal structure, such as a rib of wings 112 may be composed of carbon fiber material as well.

With continued reference to FIG. 1, "carbon fiber material" as described in this disclosure is a material including carbon fibers. The carbon fibers may be spooled into carbon strands. In some embodiments, carbon fiber material may include a composite material. A "composite material" as described in this disclosure refers to a material which is produced from two or more materials. For example, a composite material may include a plurality of carbon fiber strands that are permeated with plastic resin. In some embodiments, carbon fiber material may include a carbon fiber lamina. A "lamina" for the purposes of this disclosure is a thin layer of material. For example, a lamina may be a thin layer of the composite material mentioned above. In some embodiments, carbon fiber material may include a carbon fiber lamina, the carbon fiber lamina having a plurality of carbon fiber strands. Carbon fiber material may further include a carbon fiber composite lamina wherein the carbon fiber composite lamina includes a thin layer of the plurality of carbon fibers combined with a resin. In some embodiments, carbon fiber material includes a stitched resin infused carbon fiber cloth. "Stitched resin infused carbon cloth" as described herein is a fibrous material, such as carbon, that is stitched together and embedded within a resin. Stitched resin infused carbon cloth may include a composite laminate wherein the composite laminate is held together and reinforced with stitching. Stitched resin infused carbon fiber cloth may include a plurality of carbon fiber material layers, wherein the plurality of carbon fiber material layers are stitched together prior to molding. Stitched resin infused carbon fiber cloth may further include a composite having a single layer. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. Stitched resin infused carbon cloth may include stitching wherein the stitching binds the one or more composite lamina of the composite laminate. Carbon fiber material may be stitched using a modified lock stitch, a lock stitch, a chain stitch or the like. In some embodiments, carbon fiber material may be stitched using material such as polyester, aramid or a thermoplastic. Stitched infused carbon fiber cloth may further include a plurality of layers, wherein each layer is a composite of carbon fibers and resin. In some embodiments, stitching provides delamination resistance and improves damage tolerance of a composite laminate. Stitched resin infused carbon fiber cloth may be formed using a resin transfer molding process. Resin Transfer Molding as described is a closed molding process wherein resin is injected into a mold having a dry composite, such as carbon fibers, and clamped together. Continuing, a vacuum is then applied to the mold to remove any air and ensure that the dry composite has been properly infused. The carbon fiber material may be placed into a vacuum bag wherein air is sucked out of the vacuum bag and resin is drawn into the vacuum bag. The drawn resin infused the carbon fiber cloth and creates the molded part. Additional disclosure related to carbon fiber material may found in U.S. patent application Ser. No. 18/117,145 titled "AIRCRAFT WITH CARBON FIBER MATERIAL AND A METHOD OF MANUFACTURE," filed on Mar. 3, 2023, incorporated by reference, in its entirety, within this disclosure.

With continued reference to FIG. 1, freighter aircraft 100 is a long-range aircraft. "Long range aircraft" is an aircraft capable of long-range flight as described above. Long range aircraft may include a maximum flight distance of between 5000 and 8000 nm. Long range aircraft may include a maximum flight distance of between 4000 and 10000 nm. Long range aircraft may include a maximum flight distance of between 4000 and 8000 nm. Long range aircraft may include a maximum flight distance of between 4000 and 6000 nm. Long range aircraft may include a maximum flight distance of between 4000 and 5000 nm. Long range aircraft may include a maximum flight distance of 4,780 nm. In some embodiments, long range aircraft may include a maximum flight distance of 9000 nm. In some embodiments, long-range aircraft may include a maximum flight distance of 12,000 nm. In some embodiments, long-range aircraft may include freighter aircraft 100 having an aspect ratio of at least 8. "Aspect ratio" as described herein refers to a ratio of a wing length over an average wing chord. Aspect ratio may be calculated as the length of a wings 112 pan squared over a wing area $$\left( \frac{Wingspan^2}{Wing\ Area} \right).$$

The aspect ratio of a commercial tube and wing aircraft may range from 7 to 9. A higher aspect ratio for an aircraft indicates that an aircraft has larger wings 112 whereas a lower aspect ratio indicates that an aircraft has smaller wings 112. An aircraft with a higher aspect ratio generally gives an aircraft increased lift and decreased induced drag, thereby increasing fuel efficiency. In addition, an aircraft with a higher aspect ratio has more stability as the larger wings 112 help balance the body of the aircraft. For example, a tube and wing tanker aircraft such a McDonnell Douglas KC-10 contains an aspect ratio of 6.8 wherein the wings 112 pan is 50.41 meters, and a wing area is 367.7 square meters. The KC-10 uses about 18,099 liters of fuel per hour. In contrast, a Boeing 747 super freighter having a wings 112 pan of 211 meters and wing area of 5650 square meters contains an aspect ratio of about 7.8 uses about 1500 liters of fuel per hour. In addition, the Boeing 747 supertanker contains a maximum takeoff weight almost double that of the KC-10. An aircraft with a higher aspect ratio may be preferred for long range flight where fuel efficiency of the aircraft may be important. As opposed to tube and wing freighter aircraft 100 that contain a maximum flight distance of 5,000 nm, freighter aircraft 100 is a long-range aircraft. As a result, an increased aspect ratio will increase fuel efficiency of freighter aircraft 100. In addition, an aircraft with a higher aspect ratio may be preferred for long range where increased stability may be favored over increased maneuverability. As opposed to short haul flights wherein a lower aspect ratio may be preferred for easier takeoff and landing, long range aircraft may include a higher aspect ratio such that long-range aircraft is configured for long-range flight. In some embodiments, freighter aircraft 100 may contain an increased wing length wherein freighter aircraft 100 contains an aspect ratio of at least 9. In some embodiments, freighter aircraft 100 may include an increased wing length wherein commercial aircraft contains an aspect ratio of at least 10. In some embodiments long-range aircraft may include a higher cruising speed as opposed to a short-range freighter aircraft 100. In some embodiments, long-range aircraft may further include an aircraft flying a long-range altitude. Long range altitude may include an altitude of at least 36,000 feet.

With continued reference to FIG. 1, freighter aircraft 100 is a long-range aircraft wherein freighter aircraft 100 contains a maximum payload weight of 120,000 lbs. and has a maximum range of 4,780 nautical miles. Additionally or alternatively freighter aircraft 100 may contain a maximum takeoff gross weight of 317,000 lbs. Additionally or alliteratively, freighter aircraft 100 may be configured for long-range flight wherein freighter aircraft 100 has a maximum fuel burn of 0.270 lbs per ton-nautical mile. In some embodiments, freighter aircraft 100 may contain a maximum fuel burn of 0.262 lbs per Ton-nm. In some embodiments, long range-aircraft and/or fuel capacity may contain a maximum freighter capacity of 50,000 lbs wherein freighter aircraft 100 contains a maximum radius of 5,750 nautical miles. Additionally, or alternatively, fuel storage 124 may contain a maximum fuel capacity of 121,000 lbs wherein freighter aircraft 100 contains a maximum flight radius of 2,500 nautical miles. In some embodiments, freighter aircraft 100 is a long-range aircraft wherein second fuel store 136 contains a maximum fuel capacity of 22,750 lbs. and a maximum flight radius of 7,000 nautical miles.

With continued reference to claim 1, a portion of aircraft skin may include a carbon fiber material as described above. Portion may include any section or segment of aircraft skin. Portion may further include an entirety of aircraft skin. In some embodiments, carbon fiber material may include a stitched resin infused carbon fiber cloth. In some embodiments aircraft skin may contain a skin thickness of at least 0.5 mm. In some embodiments, a portion of aircraft skin may contain a skin thickness of at least 2.00 mm wherein freighter aircraft 100 is configured for long range flight. A higher skin thickness may be beneficial for long range flight wherein the higher skin thickness may support an aircraft having more weight or increase structural requirements. In some embodiments, aircraft skin may contain a skin thickness of at least 3.00 mm or more.

With continued reference to FIG. 1, freighter aircraft 100 may include a landing gear system, the landing gear system having a nose gear disposed proximate a front of the aircraft, the nose gear controllably movable between a first position in which the nose gear is retracted, and a second position in which the nose gear is extended. "Retracted" for the purposes of this disclosure refers to a positioning of one or more components of the landing gear system, wherein the components are not extended to their maximum capable length. In a non-limiting example, a component may be retracted wherein the component may extend outside of the outer mold line but only a portion of its maximum capable length. Continuing, the component may be retracted when the component only extended half of its capable length. In a first position, nose gear may be retracted or stowed away within blended wing body 104 and/or main body 108. Nose gear may include a hinge, a swingarm, or any folding mechanism that may fold nose gear to store away into BWB 104 and/or main body 108. In second position, nose gear may extend at or past a ground surface. "Extended" for the purposes of this disclosure is a positioning of one or more landing gear components outside of the outer mold line wherein the components extend at least a portion of their maximum length. For example, a landing gear system may be extended wherein a component may extend a portion or the entirety of the maximum capable length. Landing gear system may further include a main gear disposed proximate a rear of the aircraft, the main gear controllably movable between a third position, in which the main gear is extended, and a fourth position, in which the main gear is retracted, wherein, in a ground position, the nose gear is in the first position and main gear is in the third position and a fuselage of the aircraft is substantially level with the ground. In a third position, main gear may be extended at the same length as nose gear. In some embodiments, third position includes a position wherein main gear is extended at or below ground surface relative to nose gear. In a fourth position main gear may be retracted wherein main gear is not fully extended. This may include main gear being partially extended wherein main gear is at or below ground surface. In an angle-of-attack (AOA) position, the nose gear is in the second position and the main gear is in the fourth position and the fuselage of the aircraft is rotated to a positive AOA with respect to the ground. In some embodiments, freighter aircraft 100 may contain landing gear system wherein freighter aircraft 100 has a required takeoff field length of 8,340 ft and a required landing field length of 4,400 ft. In some embodiments, the tilting functionality of landing gear may allow aircraft 100 to achieve a lower required takeoff field length and/or required landing field length than what would otherwise be possible. In some embodiments, freighter aircraft 100 may have a required takeoff field length of 8,340 ft or less and a required landing field length of 4,400 ft or less. For the purposes of this disclosure, a "landing field length" is the length of a runway on which an aircraft is to land. For the purposes of this disclosure, a "required landing field length," is the length of the shortest runway on which an aircraft is configured to land." For the purposes of this disclosure, a "takeoff field length" is the length of a runway on which an aircraft is to takeoff. For the purposes of this disclosure a "required takeoff field length" is the length of the shortest runway on which an aircraft is configured to be able to safely takeoff from. Landing gear system is described in FIG. 4A-4B. Additional disclosure on landing gear systems may further be found in U.S. patent application Ser. No. 15/198,611, filed on Jun. 30, 2016, and titled "TILTING LANDING GEAR SYSTEMS AND METHODS," the entirety of which is incorporated by reference.

Figure 2:
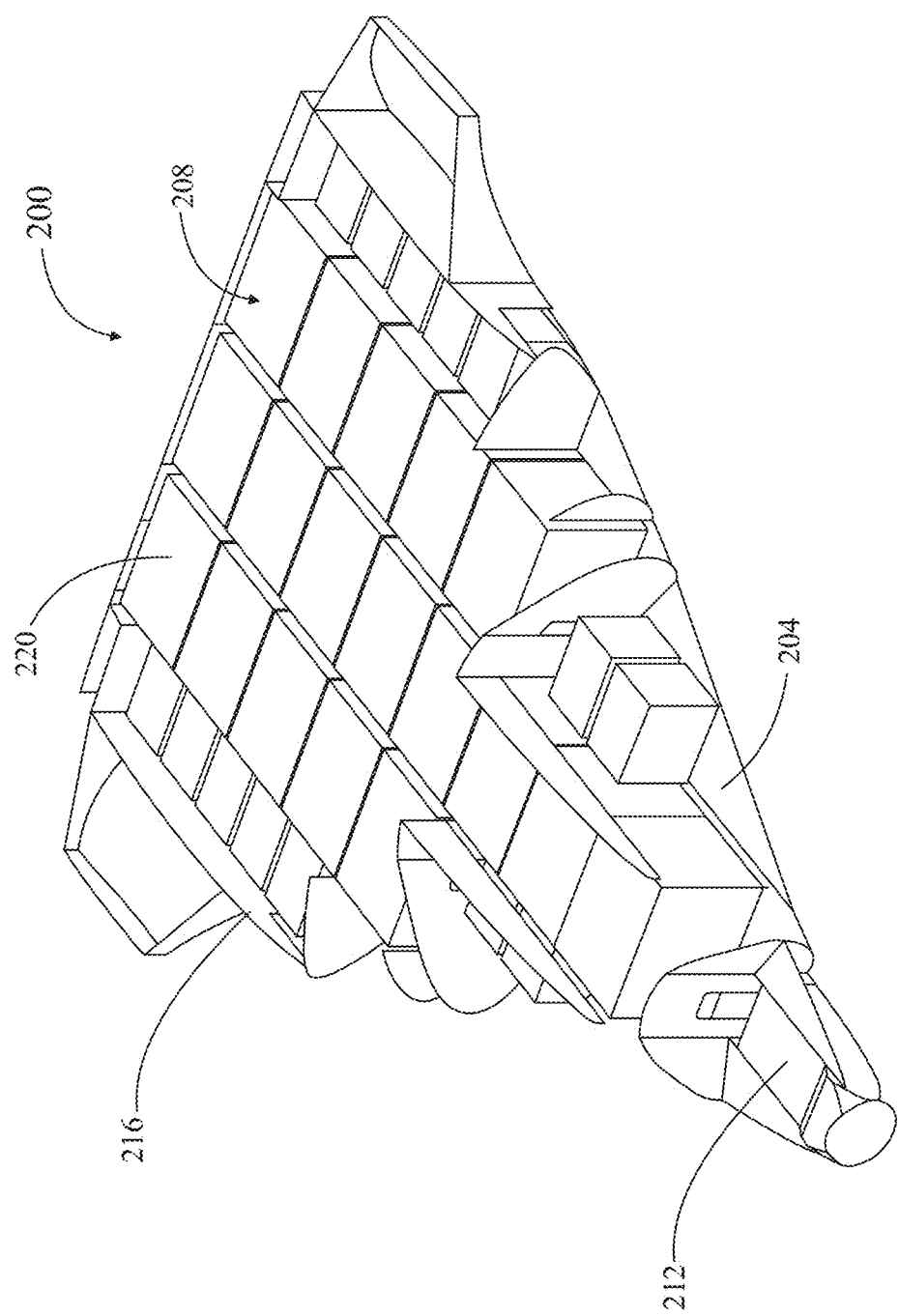
FIG. 2 is an illustration showing a perspective view of an exemplary embodiment of a freighter airframe with cargo arranged therein in accordance with one or more embodiments of the present disclosure.

Now referring to FIG. 2, an exemplary embodiment of an airframe 212 of a blended wing body freighter 200 is shown. In an embodiment, a blended wing body freighter 200 (also referred to in this disclosure as a "freighter") is a freighter having a blended wing body. As used in this disclosure, a "freighter" is an aircraft configured to store and transport cargo. Freighter 200 may include a fuselage 216 having an interior cavity. Fuselage 216 may include a cargo bay 208, which may include at least a portion of an interior cavity of fuselage, that is configured to hold cargo 220. Cargo 220 may be disposed within cargo bay 208 of airframe 212 of freighter 200. In some nonlimiting embodiments, the overall cargo capacity of freighter 200 may be substantially proportional to a surface area of a base, such as a deck 204 of airframe 212. In some cases, a post may be supporting a floor (e.g., deck 204) of freighter 200, or in other words a surface on which payload, such as cargo, may rest on due to gravity when within an aircraft 200 is in its level flight orientation or sitting on ground. In some embodiments, a post may act similarly to stringer in that it is configured to support axial loads in compression due to a load being applied parallel to its axis due to, for example and without limitation, a heavy object being placed on a floor of freighter 200. A beam may be disposed in or on any portion of fuselage of aircraft that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

In other nonlimiting embodiments, the overall cargo capacity of freighter 200 may include at least a portion of a surface area of deck 204. Cargo bay 208 may include a volumetric space used for cargo storage. In one or more embodiments, a volumetric space may include at least a portion of a width w of interior cavity, a height h of interior cavity, and a length l of interior cavity, as previously described in FIG. 1. In various embodiments, a width w of interior cavity may run parallel to a lateral axis of freighter 200 that extends wing-to-wing of a BWB of freighter 200. In various embodiments, a height h of interior cavity may extend from a surface of deck 204 to a ceiling of freighter 200, such as toward a skin of freighter 200. In various embodiments, a length l of interior cavity may run along a longitudinal axis of freighter 200 that extends nose-to-tail of freighter 200. In one or more embodiments, cargo density of freighter 200 may include a range of 6 lb/ft$^3$-11 lb/ft$^3$. Cargo bay 208 may be configured to include receptacles for fuel tanks, batteries, fuel cells, or other energy sources as described in this disclosure. In one or more nonlimiting embodiments, M1 containers may be oriented 125" wide, 96" long and 96" high. In various embodiments, interior cavity may include a useable height (e.g., ceiling height h) set to accommodate 96-inch height throughout the bay or cabin and in structural openings to permit lateral and longitudinal motion of containers. In one or more embodiments, height h of interior cavity may include a total height of a height of a lower portion and a total height of upper portion. In nonlimiting embodiments, height h may include ceiling height, which includes a distance from a base, such as deck 204, to interior surface of an upper skin of airframe 212.

In one or more nonlimiting embodiments, freighter 200 may retain an outboard volume for LD-3 containers and include securing systems or mechanisms to restrain LD-3, such as four LD-3 containers, containers in a front area of cargo bay 208. In one or more embodiments, M1 containers may be used for cargo storage in cargo bay 208 because they are rectangular and a suitable shape for efficient filling of a cargo compartment (e.g., usable space for cargo storage of interior cavity) of cargo bay 208. However, other container shapes may also be used for cargo storage. For example, and without limitation, containers may include one or more chamfered edges. In a nonlimiting embodiment, a chamfered edge of a container may allow a container to fit within a cylindrical fuselage with, for example a substantially circular or elliptical cross section with reduced volumetric efficiency. As understood by one of ordinary skill in the art, interior cavity and/or cargo compartment may be various shapes and sizes, such as, for example, spherical, cylindrical, cubic, and the like. In various nonlimiting embodiments, a length l of cargo bay may be configured to hold five M1 containers between an aft bulkhead and a main transverse bulkhead of airframe 212. An additional three M1 containers may fit on a centerline of a forward portion of interior cavity while leaving enough room between the forward container and a cockpit bulkhead, a cross-aisle and some supernumerary seats.

Figure 3:
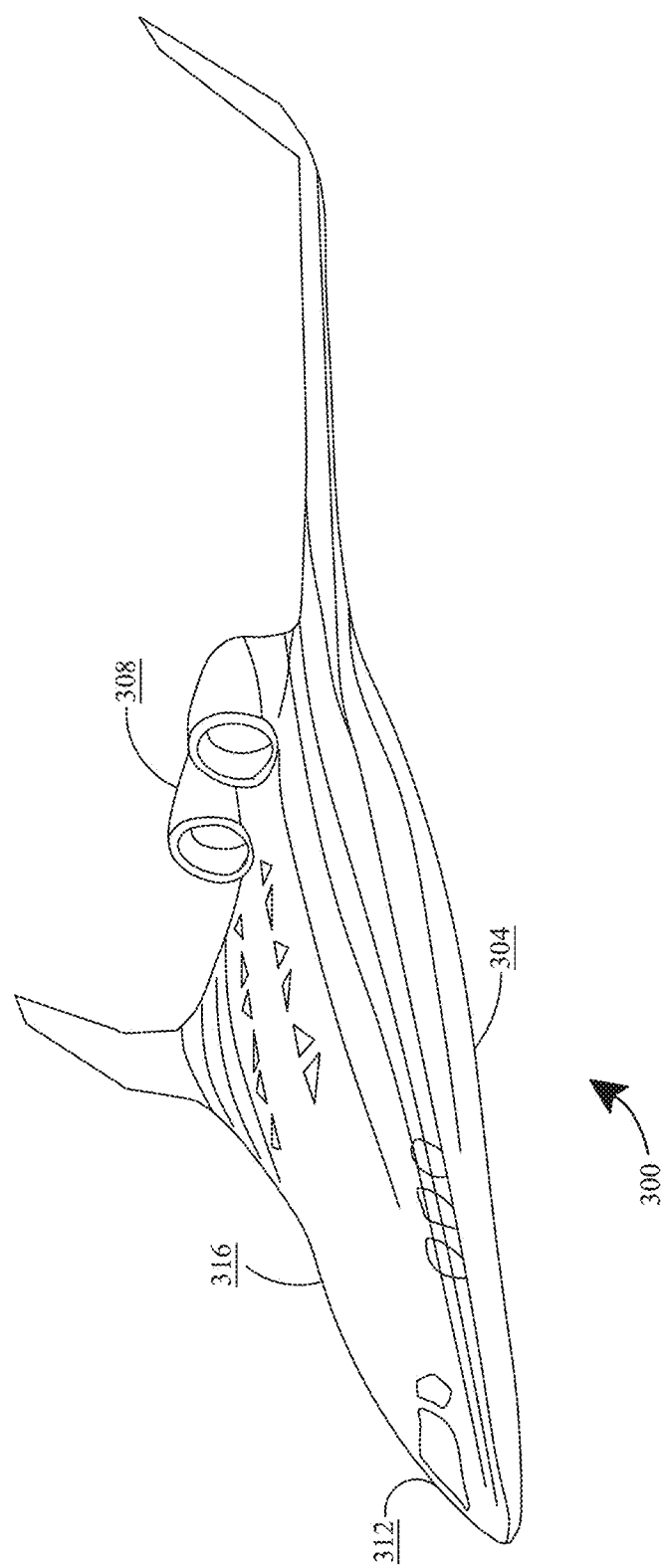
FIG. 3 is a schematic of an exemplary blended wing aircraft.

Referring to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 3, BWB 304 of aircraft 300 may include a nose portion. A "nose portion," for the purposes of this disclosure, refers to any portion of aircraft 300 forward of the aircraft's fuselage 316. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e., above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contain an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 312 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for the bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver.

In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determine as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein, an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g., length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component 308, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 312 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 3, aircraft 300 may include a flight component 308 that includes at least a nacelle 308. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases, an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varied or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4A:
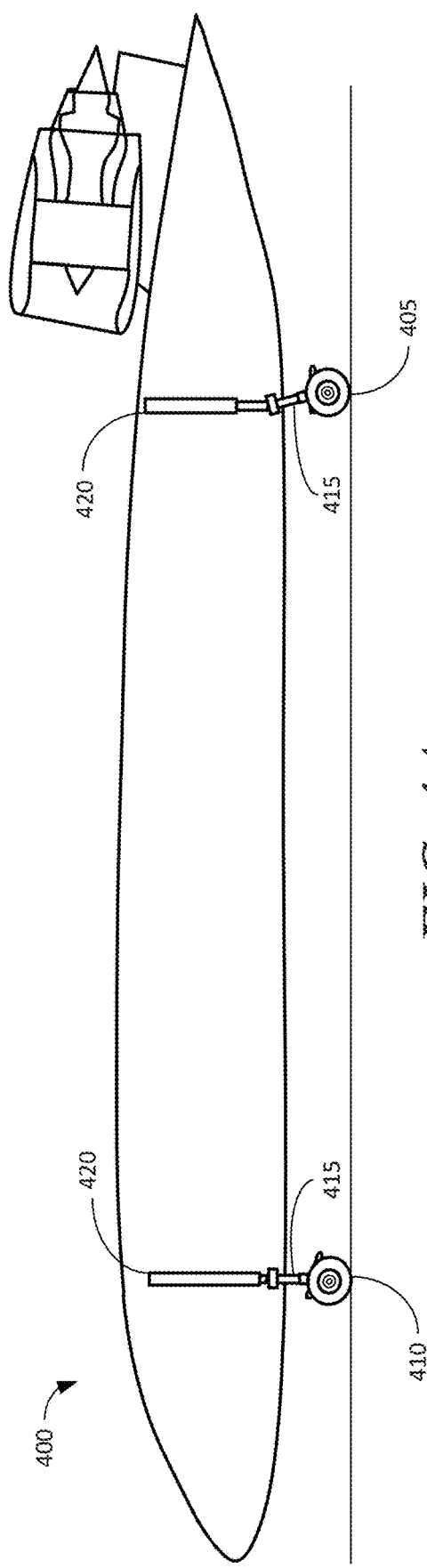
FIG. 4A-4B are side views depicting a blended-wing aircraft with a direct hydraulic tilting landing gear system in accordance with some examples of the present disclosure.
Figure 4B:
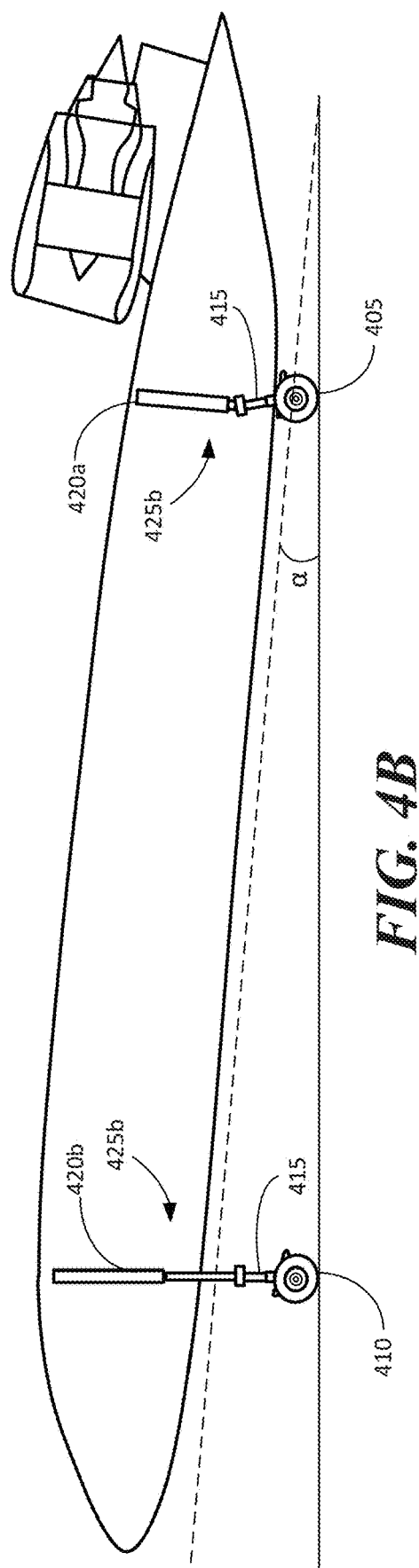

Referring now to FIG. 4A-4B, a side view of a blended wing aircraft with a landing gear system is illustrated. Landing gear system 400 may include a main gear 405 that can squat and/or a nose gear 410 that can extend to mechanically provide the desired angle-of-attack (AOA or $\alpha$) for takeoff and/or landing. In some examples, landing gear system 400 can comprise two or more main gears 405a and one or more nose gear 410. In some cases, landing gear system 400 may include standard oleo struts 415 (e.g., airfoil pneumatic struts) mounted on one or more actuators 420. In some embodiments, the actuators 420 can be cylinders that are hydraulically or pneumatically linked, such that when one hydraulic cylinder 420 collapses the other hydraulic cylinder 420 extends, and vice versa. In some embodiments, the hydraulic cylinder 420 can be independently controlled to work in concert. In a preferred embodiment, the hydraulic cylinder 420 can comprise hydraulic cylinders that are also hydraulically linked.

As shown in FIG. 4A, therefore, in the level, or ground, configuration, the aircraft can be substantially level. In this configuration, the hydraulic cylinders 420 can be positioned such that the oleo struts 415 suspend the aircraft at a substantially level attitude with respect to the ground. This can enable passengers and cargo to be loaded onto the aircraft in the conventional manner. This can also enable the aircraft to be taxied for takeoff without unnecessarily affecting the pilot's view of the ground or adversely affecting ground handling. In other examples, the aircraft can have a slightly nose heavy configuration, for example, such that when the aircraft is on the ground, the nose hydraulic cylinder 420b is fully retracted and the main hydraulic cylinder 420a is fully extended. As discussed below, in some examples, for safety purposes, the hydraulic cylinders 420 can be locked in the level position anytime the aircraft is on the ground and below a predetermined speed unless otherwise overridden—e.g., for maintenance purposes.

As shown in FIG. 4B, however, to enable the aircraft to rotate for takeoff or landing, the main hydraulic cylinder 420a can collapse and the nose hydraulic cylinder 420b can extend to provide the desired AOA. In this configuration, as with conventional landing gear, the oleo struts 415 react to impacts and undulations on the ground, but these motions are measured in inches, quite small relative to the stroke needed for the tilting system. As the hydraulic cylinders collapse and extend, however, the overall height of the strut/cylinder assembly 425 changes. Thus, as the main hydraulic cylinder(s) 420a (i.e., two or more main hydraulic cylinder 420a for the two or more main gears 405a) retracts, the rear strut/cylinder assembly 425a squats. Conversely, as the nose hydraulic cylinder 420b (i.e., the cylinder for the nose gear 410) extends, the nose strut/cylinder assembly 425b extends. This has the effect of lowering the rear of the aircraft and raising the front of the aircraft to simulate takeoff rotation and/or landing flare.

Notably, however, this attitude is achieved with the landing gear 405, 410 still on the ground. In addition, as discussed below, the location and size of the hydraulic cylinders 420 can be such that they are essentially in equilibrium about the CG. In this manner, the system 400 can rotate the aircraft with very little force provided by the aerodynamic surfaces of the wing. This (1) overcomes the aforementioned issues related to overcoming a large LMG and (2) does so with the wing in a more aerodynamically efficient configuration. Because rotation requires much less negative lift and thus, deflection of the elevons (or elevons in a tailless configuration) and/or flaps, the wing is also in a "cleaner" aerodynamic configuration (at least initially). In other words, significantly less negative lift is required at the back of the wing to generate the rotation moment, enabling the wing to provide greater positive lift for takeoff. This, in turn, can reduce takeoff speed, and therefore takeoff distance.

Upon takeoff, once the main gear 405 has cleared the tarmac, the location of the main gear 405 is no longer relevant from an aerodynamic standpoint. Once aloft, the location of the main gear 405 is relevant only from a weights and balances standpoint, which can be accounted for with fuel, cargo, and/or passenger weight, among other things. At or before liftoff, therefore, the flight control surfaces can be positioned to provide the necessary aerodynamic forces to maintain the desired AOA for climb out.

Of course, while shown and described with hydraulic cylinders 420, pneumatic cylinders and other types of linear or rotary actuators could be used. Landing gear system 400 could utilize linear actuators, for example, electrically driven by the aircraft's electrical system. Landing gear system 400 could also utilize servo motors, for example, with a rack and pinion or pushrod actuation to the landing gear 405, 410. Indeed, rather than using separate hydraulic cylinders 420, as shown, landing gear system 400 could use lengthened versions of the existing oleo struts 415 interconnected in a similar manner. This configuration might reduce weight and complexity if sufficient space is available in the airplane for the lengthy struts 415 and the volume swept by the rotation angle needed for retraction. Thus, any type of mechanism that can enable the main gear 405 to squat and/or the nose gear 410 to lift can provide the necessary AOA.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5A:
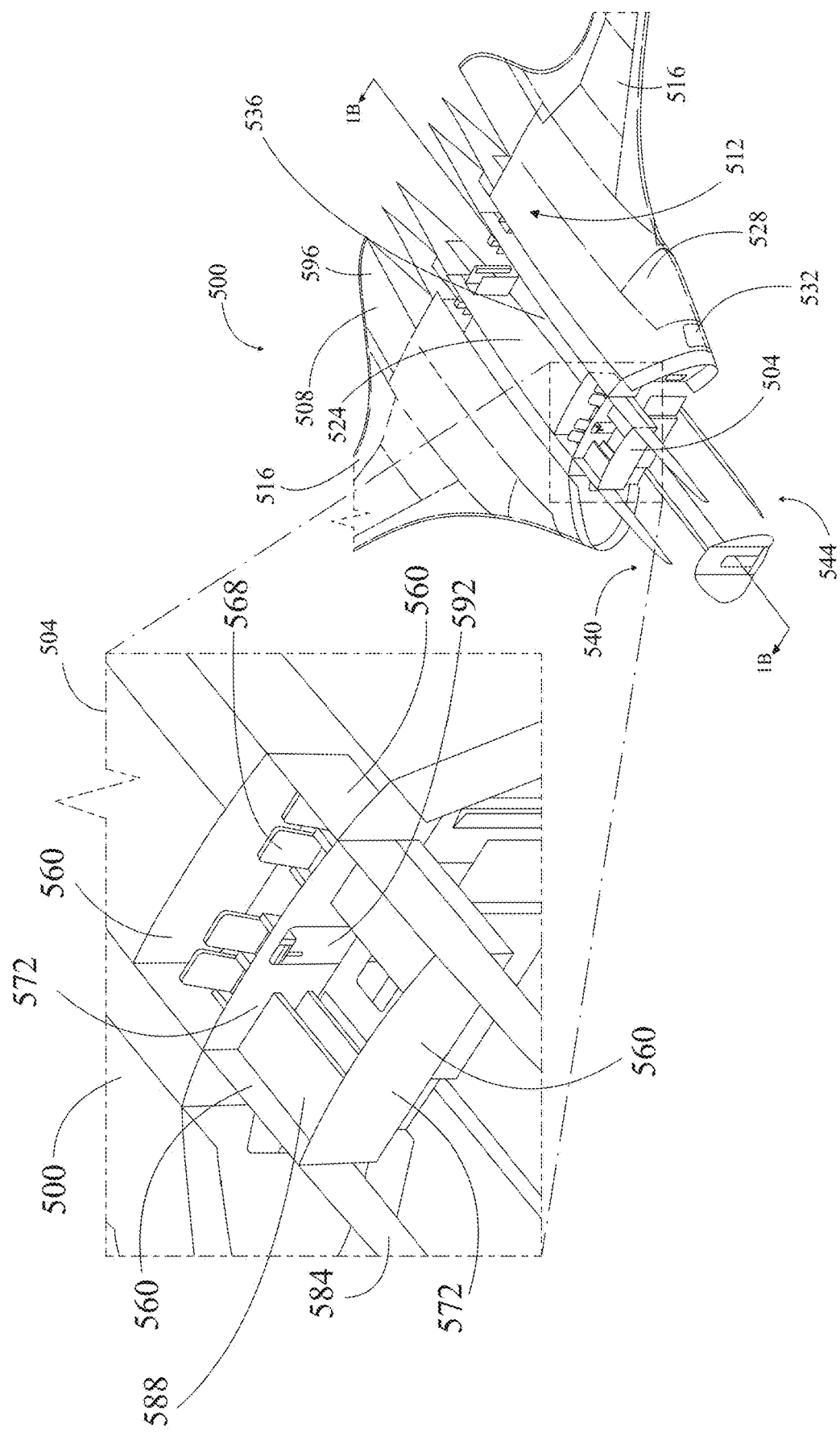
FIG. 5A is an illustration showing a partially transparent perspective view of an exemplary embodiment of a blended wing aircraft having a passenger compartment.

Referring now to FIG. 5A, a partially transparent view of an exemplary embodiment of a blended wing body (BWB) aircraft 500 with an upper passenger compartment 504 is shown, a "special purpose aircraft" is an aircraft used for a particular, designated purpose. A special aircraft may include a military or civilian aircraft having a particular role, such as a freighter, tanker, and the like, as discussed further in this disclosure. For example, and without limitation, blended wing body aircraft 500 may include a freighter aircraft, such as freighter aircraft described above. In another example, and without limitation, blended wing body aircraft 500 may include a tanker aircraft. In some cases, BWB 508 may include two wings 516

With continued reference to FIG. 5A, BWB 508 may include one or more structural components 524 of aircraft 500 and/or of an airframe of aircraft 500. Structural components 524 may be used to construct and define an airframe of aircraft 500. Structural components 524 may provide physical stability during an entirety of an aircraft's flight envelope, while on ground, and during normal operation. Structural components 524 may include, but are not limited to, struts, beams, formers, stringers, stiffeners, ribs, longerons, interstitials, ribs, (structural) skin, doublers, straps, spars, or panels, and the like. In various embodiments, structural components 524 may also include pillars. In some cases, for the purpose of aircraft cockpits having windows/windshields, pillars may include vertical or near vertical supports around a window configured to provide extra stability around weak points in a structure of aircraft 500, such as an opening where a window is installed. Where multiple pillars are disposed in a structure, or airframe of aircraft 500, pillars may be so named A, B, C, and so on named from nose to tail. Pillars, like any structural element, may be disposed a distance away from each other, along an exterior of BWB 508. Depending on manufacturing methods of BWB 508, pillars may be integral to an airframe and/or skin of aircraft, composed entirely of internal framing, or alternatively, may be only integral to structural skin elements. Structural skin will be discussed in greater detail below.

With continued reference to FIG. 5A, BWB 508 may include a plurality of materials, alone or in combination, in its construction. At least a BWB 508, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 508 may include aluminum tubing mechanically connected or coupled in various orientations. Mechanical fastening of aluminum members (whether pure aluminum or alloys) may include temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 508 may, additionally or alternatively, use wood or another suitably strong yet light material for an internal structure or structural components.

With continued reference to FIG. 5A, aircraft 500 may include a monocoque or semi-monocoque construction. In various embodiments, one or more components, such as structural components 524 of BWB 508 may be composed of carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In some cases, carbon fiber is beneficial, because of high compressive strength. Where high compressive strength is not needed, in some cases, other high strength fibers may be used. Exemplary high strength fibers include without limitation aramid (i.e. Kevlar), Technora, and Spectra. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-50 micrometers and include a high percentage (e.g., above 85%) of carbon atoms. A person of ordinary skill in the art will appreciate that the advantages of carbon fibers include high stiffness, high tensile strength, low weight, high chemical resistance, high temperature tolerance, and low thermal expansion. According to one or more embodiments, carbon fibers may be combined with other materials to form a composite where, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, and without limitation, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as, and without limitation, fuselages, fairings, control surfaces, and structures, among others. BWB 508 may be configured to contain pressure and resist cabin de-pressurization.

With continued reference to FIG. 5A, aircraft 500 may include a main body 512. Main body 512 may be centrally located laterally within aircraft 500, for example substantially between two wings. In some embodiments, aircraft 500 may have a lift distribution across a span that is approximately elliptical. In some cases, lift distribution may be understood of as a two-dimensional distribution where an x-axis represents span station laterally across aircraft, from tip to tip and a y-axis represents total lift per unit span (for example, in pounds per inch of span). In some cases, total lift per unit span may be a function of a product of a local wing chord and a local wing lift coefficient. As main body 512 will typically have a long local chord length, in some cases, a designer will minimize local lift coefficient at main body 512 to ensure an elliptical lift distribution. Lift coefficient of main body 512 may be minimized by adjusting main body incidence (relative to the transitions and outboard wings) and by adjusting the camber of main body 512 (e.g., to a low value, typically).

With continued reference to FIG. 5A, main body 512 may include a fuselage 528. A "fuselage," for the purposes of this disclosure, refers to a main body of aircraft 500 except for nose, wings, empennage, nacelles, and control surfaces. In some cases, fuselage 528 may contain a payload of an aircraft, such as in the case of a freighter. Fuselage 528 may include structural components 524, as previously mentioned in this disclosure, that physically support a shape and structure of aircraft 500. Structural components 524 may take a plurality of forms, alone or in combination with other types, and arrangements. Structural components 524 vary depending on construction type of aircraft 500 and specifically, fuselage 528. In some embodiments, fuselage 528 may include a truss structure. A truss structure may be used with a lightweight aircraft. A truss structure may include welded steel tube trusses. A "truss," as used in this disclosure, is an assembly of beams that create a rigid structure. For example, and without limitation, a truss may include combinations of triangles to create three-dimensional shapes. A truss structure may include wood construction in place of steel tubes, or a combination thereof. In some embodiments, structural components 524 can comprise steel tubes and/or wood beams. A structural skin (also referred to in this disclosure as a "skin"), such as skin 596, may be layered over a body shape constructed by trusses. Skin 596 may include a plurality of materials such as plywood sheets, aluminum, fiberglass, carbon fiber, any combination thereof, and the like. In one or more embodiments, fuselage 528 may include an interior cavity 536.

With continued reference to FIG. 5A, in embodiments, fuselage 528 may include geodesic construction. Geodesic structural elements may include stringers wound about formers, which may be alternatively called station frames, in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis (i.e., longitudinal axis A, shown in FIG. 5B) of aircraft 500. In some cases, a former forms a general shape of fuselage 528. A former may include differing cross-sectional shapes at differing locations along a fuselage, as the former is a structural component that informs an overall shape of the fuselage. In embodiments, skin 596 may be anchored to formers and stringers such that an outer mold line (OML) of volume encapsulated by the formers and stringers comprises a same shape as aircraft 500 when installed. In other words, former(s) may form a fuselage's rib(s), and stringers may form interstitials between the ribs. A spiral orientation of stringers about formers may provide uniform robustness at any point on an aircraft fuselage such that if a portion sustains damage, another portion may remain largely unaffected. Skin 596 may be mechanically connected or coupled to underlying stringers and formers and may interact with a fluid, such as air, to generate lift and perform maneuvers.

With continued reference to FIG. 5A, according to some embodiments, fuselage 528 may include a monocoque construction. Monocoque construction may include a primary structure that forms a shell (e.g., skin 596) and supports physical loads. Monocoque fuselages are fuselages in which the aircraft skin or shell may also include a primary structure. In monocoque construction, aircraft skin would support tensile and compressive loads within itself and true monocoque aircraft can be further characterized by an absence of internal structural elements. Skin 596 in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 5A, according to some embodiments, fuselage 528 may include a semi-monocoque construction. Semi-monocoque construction, as used in this disclosure, is used interchangeably with partially monocoque construction, as discussed above. In semi-monocoque construction, fuselage 528 may derive some structural support from stressed skin and some structural support from underlying frame structure made of structural components (e.g., 524). Formers or station frames can be seen running transverse to longitudinal axis A of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically connected or coupled to formers permanently, such as with rivets. Skin can be mechanically connected or coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body", or alternatively "unitary construction", vehicle are characterized by a construction in which body, floor plan, and chassis form a single structure, such as, for example, an automobile. In the aircraft world, a unibody may include internal structural elements, like formers and stringers, constructed in one piece, integral to skin 596. In some cases, stringers and formers may account for a bulk of any aircraft structure, excluding monocoque construction. Stringers and formers may be arranged in a plurality of orientations depending on aircraft operation and materials. Stringers may be arranged to carry axial (tensile or compressive), shear, bending, or torsion forces throughout their overall structure. Due to their coupling to skin, aerodynamic forces exerted on skin may be transferred to stringers. Location of such stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 5A, in some cases, a primary purpose for a substructure of a semi-monocoque structure is to stabilize skin 596. Typically, an aircraft structure is required to have a very light weight and, as a result, in some cases, skin 596 may be substantially thin. In some cases, unless supported, a thin skin structure may tend to buckle and/or cripple under compressive and/or shear loads. In some cases, underlying structure may be primarily configured to stabilize skin 596, which may include one or more skins. For example, and without limitation, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 5A, in some embodiments, another common structural form is a sandwich structure. As used in this disclosure, a "sandwich structure" is a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 5A, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of fuselage 528 and/or BWB 508. In some cases, a monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

Figure 5B:
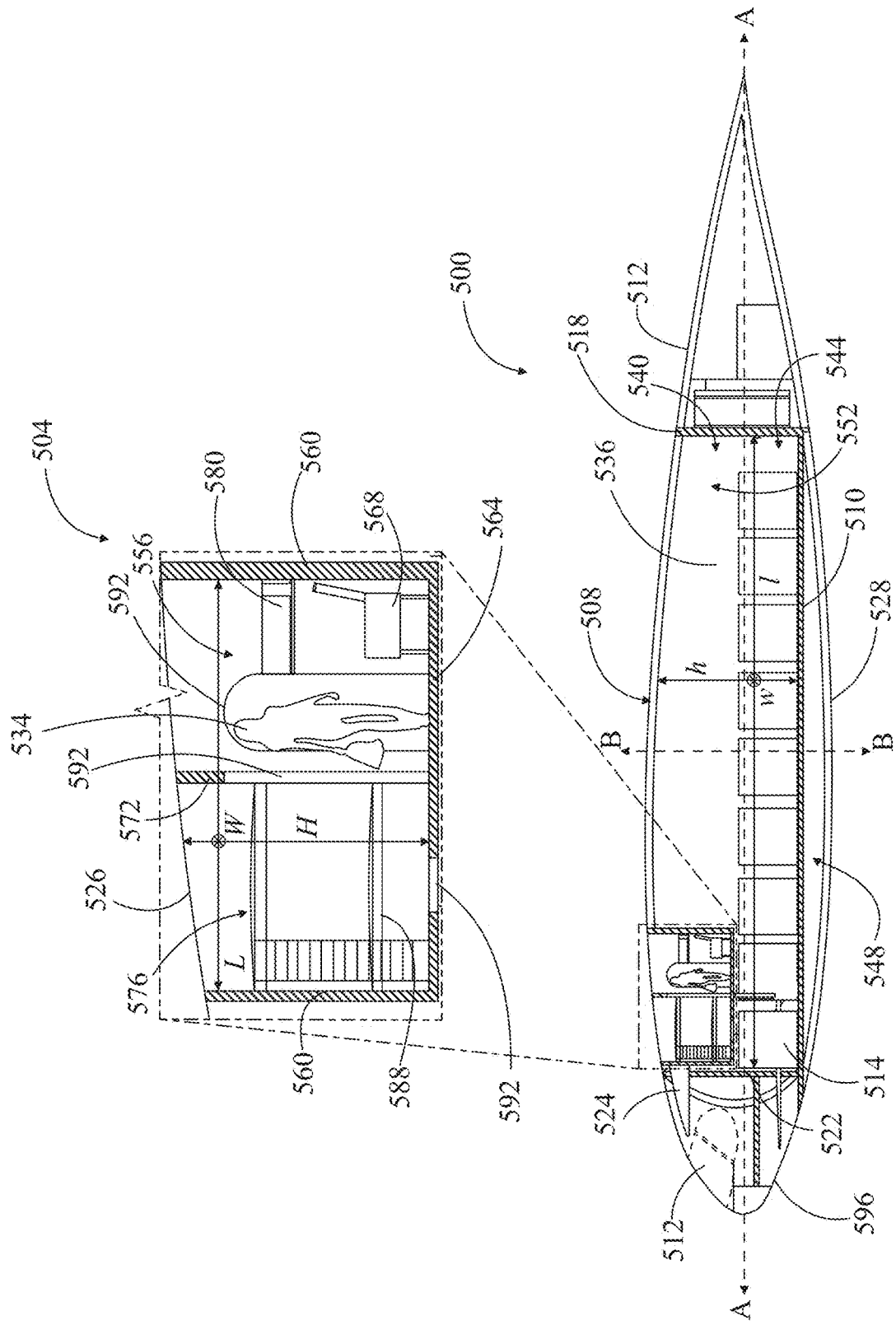
FIG. 5B is an illustration showing a cross-sectional view of the blended wing aircraft taken along line 1B-1B of FIG. 5A in accordance with one or more embodiments of the present disclosure

Now referring to FIG. 5B, fuselage 528 may include an interior cavity 536. For the purposes of this disclosure, an "interior cavity" is a space disposed within a fuselage of an aircraft and defined by the airframe of the aircraft. For instance, and without limitation, interior cavity 536 may be defined by an interior surface of fuselage 528. Interior cavity may be defined by at least a height h, a length l, and a width w, as shown in FIG. 5B. As understood by one of ordinary skill in the art, height h, length l, and width w may vary along a cross section of interior cavity based on a shape of interior cavity, as discussed further below. In some embodiments, interior cavity 536 may include one or more cabins, decks, holds, bays, cubicles, any combination thereof, and the like. For instance, and without limitation, interior cavity 536 may include a single volumetric space or region configurable to house any payload, including cargo 514, passengers, and fuel. In another instance, and without limitation, interior cavity 536 may be compartmentalized to include a plurality of volumetric spaces disposed within interior cavity 536. Such compartmentalized spaces may be used for the same purpose of various purposes, such as cargo 514, passenger, fuel, or equipment storage. For the purposes of this disclosure, "payload" the part of a vehicle's load which is being purposely transported, for instance the part of a vehicle's load from which revenues are being derived. For the purposes of this disclosure, "cargo" is goods that are moved from one location to another via transportation. Cargo 514 may include container cargo, dry bulk cargo, liquid bulk cargo, break bulk cargo, neo bulk cargo, roll-on roll-off (RO RO) cargo, and the like. Payload may include solids, liquids, persons (e.g., military personnel, medical personnel, commercial passengers, or any other types of passengers aboard aircraft), and the like. Interior cavity 536 may be configured to include receptacles for fuel tanks, batteries, fuel cells, or other energy sources. In some cases, interior cavity 536 may include a base 510 of airframe, which one or more structural components 524 may be attached thereto. Base 510 may include a deck, or floor, that cargo may be placed on during transportation (e.g., operation or movement of aircraft 500). In some embodiments, interior cavity 536 may include a post may be supporting a floor, or in other words a surface on which a passenger, operator, passenger, payload, or other object would rest on due to gravity when within an aircraft 500 is in its level flight orientation or sitting on ground (e.g., parked or taxing). A post may act similarly to stringer in that it is configured to support axial loads in compression due to a load being applied parallel to its axis due to, for example, a heavy object being placed on a floor of aircraft 500. A beam may be disposed in or on any portion of fuselage that requires additional bracing, specifically when disposed transverse to another structural component, like a post, which would benefit from support in that direction, opposing applied force. A beam may be disposed in a plurality of locations and orientations within a fuselage as necessitated by operational and constructional requirements.

Referring back to FIG. 5A, aircraft 500 includes a passenger compartment 504 that is configured to seat one or more passengers of blended wing body aircraft 500. A passenger may include any persons, such as aircraft personnel (e.g., pilots or crew), commercial passengers, military personnel, and the like. For instance, and without limitation, passenger compartment 504 may be used by flight crew of aircraft to reside when not assisting other passengers on the plan located elsewhere, such as in the main cabin of the fuselage of the aircraft. In some cases, passenger compartment 504 may be used by flight crew when resting for, or during, long flights. In one or more embodiments, passenger compartment 504 may include an upper passenger compartment. For the purposes of this disclosure, an "upper passenger compartment" is a passenger compartment located within an upper portion 540 of a fuselage 528 of an aircraft 500. For instance, and without limitation, upper passenger compartment may be located in an upper portion 540 (e.g., an upper fraction, such as an upper half) of fuselage 528. In some embodiments, upper passenger compartment may be located in an upper portion 540 of interior cavity 536 of fuselage 528. For example, and without limitation, upper passenger compartment may be positioned above cargo 514, which is disposed in interior cavity 536 of fuselage 528, as shown in FIG. 5B. Passenger compartment 504 may include a defined area positioned above a deck or base of aircraft 500 (shown in FIG. 5B). In one or more embodiments, a volume of aircraft 500 may be altered to provide passenger accommodations, such as by reshaping an outer-mold-line (OML) of aircraft 500, but still maintaining aerodynamics of aircraft 500. In other embodiments, passenger compartment 504 may be disposed within BWB 508 without altering the OML of aircraft 500 and while still maintaining favorable aerodynamic shaping of aircraft 500. At the same time, the BWB design of aircraft may provide storage space dimensions (i.e., width, length, and height) that effectively fit dimensions of various types of cargo and/or cargo containers. Furthermore, passenger compartment dimensions may allow for favorable passenger provisions in terms of cabin width, ceiling height, doors, aisles, and the like. In one or more embodiments, BWB 508 may include a large cargo door (e.g., loading door 532) and/or one or more structural openings to permit various sized containers to enter and fill interior cavity 536 of aircraft 500. In one or more embodiments, at least a lower portion 544 of fuselage 528 may include a cargo bay. In nonlimiting exemplary embodiments, cargo bay may be filled with cargo 514, such as, for example and without limitation, M5 containers.

Referring back to FIG. 5B, blended wing body 508 may include a lower portion 544 and an upper portion 540, as previously mentioned above in this disclosure. For the purposes of this disclosure, a "lower portion" is a region of a fuselage that is below the upper portion of the fuselage. In various embodiments, lower portion 544 may include an underside of fuselage 528. In some embodiments, lower portion 544 may include base 510. For the purposes of this disclosure, an "upper portion" is a region of a fuselage above a lower portion of the fuselage. In various embodiments, upper portion 540 may include a top side of fuselage 528. In one or more nonlimiting embodiments, upper portion 540 may include upper half of fuselage 528. For example, and without limitation, upper portion 540 may include a portion above longitudinal axis A and lower portion 544 may include a portion below longitudinal axis A. In one or more embodiments, lower portion 544 may be configured to store one or more objects or materials, such as cargo or fuel, to name a few. In some embodiments, passenger compartment 504 may be positioned in a front half 548 of fuselage 528. A front portion 548 of fuselage 528 may include a region of fuselage that is forward of a central axis B (i.e., an axis orthogonal to longitudinal axis A) and a rear portion of fuselage 528. For instance, and without limitation, front portion 548 may include a region of fuselage 528 that includes half of fuselage 528 from central axis B to a cockpit bulkhead 522. In other embodiments, passenger compartment 504 may extend from front half 548 to a rear portion 502. In one or more nonlimiting embodiments, and without limitation, the blended wing body 508 may include nose a nose portion, which may include a cockpit. For the purpose of this disclosure, a "cockpit" is a compartment of an aircraft for a pilot or crew members which includes systems used for operation of the aircraft. Passenger compartment 504 may be positioned adjacent (e.g., aft) to cockpit or within nose portion of aircraft 500. In other embodiments, passenger compartment 504 may be positioned in a rear half 552 of interior cavity 536. In one or more embodiments, passenger compartment 504 may include a pax compartment, which may be positioned above cargo, such as above lower portion 544. In one or more embodiments, cockpit fairing can house a height of BWB OML to accommodate passengers and cargo. Because of airframe design of aircraft 500, a height of BWB OML may be used to accommodate passengers above the main cargo region/deck where height is sufficient. In some embodiments, passenger compartment 504 may be positioned toward the front of aircraft 500, as shown in FIG. 5B. In other embodiments, passenger compartment 504 may be disposed in a center of interior cavity 536 or located at the center of a cargo bay of aircraft 500. Passenger compartment 504 may include a partial deck, where partial deck may be located at least partially above a cargo bay and/or a first fuel store within a main body 512 of blended wing body 508. For the purposes of this disclosure, a "partial deck" is an area that does not extend the entire length of a fuselage of an aircraft. For instance, and without limitation, passenger compartment may not extend the entire length of a cargo bay of aircraft 500. For example, and without limitations, passenger compartment 504 may extend only a portion of interior cavity. More specifically, and in nonlimiting embodiments, length L of passenger compartment 504 may be less than length 1 of fuselage 528. In some cases, passenger compartment 504 may be located behind a cockpit (e.g., in a nose portion of blended wing body).

Still referring to FIG. 5B, in one or more embodiments, lower portion of interior cavity may have a greater floor area than upper portion of interior cavity. "Floor area," for the purposes of this disclosure, is area of floor in a specified area.

Still referring to FIG. 5B, in one or more embodiments, passenger compartment 504 may be positioned in upper portion 540 of blended wing body 508. In one or more embodiments, passenger compartment 504 may include one or more walls 560. In various embodiments, walls 560 may include outer walls that define an outer perimeter of passenger compartment 504. In various embodiments, walls 560 may include inner walls, such as a partitioning wall 572 of passenger compartment 504. In some embodiments, one or more walls 560 may be constructed using one or more structural components 524. For instance, and without limitation, wall 560 may include at least a portion of a longitudinal stiffener, as shown in FIG. 5A. In one or more embodiments, passenger compartment 504 may include a floor 564, where floor 564 may adjoin one or more walls 560. Walls 560 and adjoined floor 564 may provide an enclosure of passenger compartment 504 that is configured to hold one or more passengers. For the purposes of this disclosure, a "floor" is a supporting surface of a passenger compartment. For example, and without limitation, a floor may include a surface that a person may stand on or that furniture may be placed upon. In one or more embodiments, passenger compartment 504 may include various seating arrangements.

Still referring to FIG. 5B, passenger compartment 504 may include a compartmentalized cabin, where passenger compartment may be divided into one or more areas (e.g., rooms or sections at least partially delineated from each other). Passenger compartment 504 may include one or more seats may be disposed within the cabin. For example, and without limitation, passenger compartment 504 may include a sitting area 556 that includes one or more seats disposed therein. In one or more embodiments, passenger compartment 504 may include internal dimensions having a height H, width W, and length L. Height H of passenger compartment 504 may include a distance from floor 564 to a ceiling 526 of passenger compartment 504. In some embodiments, height H of passenger compartment 504 may be reduced compared to conventional cabin height for commercial airlines, but still allow for ample headspace for passengers, such as passenger 534. In various nonlimiting embodiments, a cabin height H of passenger compartment 504 may include a ceiling height of less than 3 meters. Passenger compartment 504 may include a sitting area 556. For the purposes of this disclosure, a "sitting area" is a room or space designated for personnel seating during a flight of an aircraft. Sitting area 556 may include one or more seats 568. Each seat 568 may include a safety mechanism for securing a passenger sitting in the corresponding seat during operation of aircraft 500. For example, and without limitation, a safety mechanism may include a sash, strap. or lap belt. Safety mechanism may also include a fastening mechanism, such as a buckle and tongue that may engage to secure a passenger in seat 568. Seatbelt may be configured to secure a passenger during operation of aircraft 500. In nonlimiting embodiments, seat 568 may include a chair, such as a reclining chair, an armchair, a bench, a stool, foldable chair, any combination thereof or the like. In some embodiments, seat 568 may be integrated into sitting area 556. In other embodiments, seat 568 may be an individual or separate piece of furniture that may be assembled or moved into sitting area 556. In one or more embodiments, passenger compartment 504 may also include a sleeping area 576. For the purposes of this disclosure, a "sleeping area" is a space or room designated for personnel to rest during a flight of an aircraft. Sleeping area 576 may include one or more bunks 588. A "bunk", for the purposes of this disclosure, is a piece of furniture used for sleeping or resting. A bunk may include, for example and without limitation, a bed or other furniture that a passenger may rest on. In some embodiments, bunk 588 may be integrated into one or more walls of sleeping area 576. In other embodiments, bunk 588 may be a separate piece of, for example, assembled or movable furniture. For example, and without limitation, bunk 588 may include a cot, bunk (stacked) beds, a single bed, a daybed, a foldable bed, a murphy bed, a bench, a chaise lounge, a sofa, a fully or partially enclosed pod, any combination thereof, and the like. In one or more embodiments, passenger compartment 504 may include a partitioning wall 572 configured to at least partially divide sitting area 556 and sleeping area 576. In one or more embodiments, partitioning wall 572 may include an opening, such as a doorway 592, that allows for a passenger to traverse from one area to another of passenger compartment 504. In some embodiments, doorway 592 may also include a port disposed in floor 564 of passenger compartment 504, where a passenger 534 may descend/ascend from/into passenger compartment 504 via, for example, a ladder or stairs. In one or more embodiments, one or more walls 560 of passenger compartment 504 may include insulated walls. Insulated walls may be insulated to regulate a temperature, noise, and/or pressure of a cabin or one or more areas (e.g., sitting area or sleeping area) of passenger compartment 504. In one or more embodiments, one of the one or more walls 560 may include a structural component, such as a stiffener. For example, and without limitation, adjacent pair of longitudinal stiffeners 584 may define a pair of opposing walls of passenger compartment 504. In one or more embodiments, passenger compartment 504 may luggage storage 580. In some embodiments, luggage storage 580 may include overhead luggage storage for passengers. In various embodiments, luggage storage 580 may include cabinets, containers, racks, enclosure, cubbyhole, any combination thereof, and the like. In various embodiments, passenger compartment 504 may also include a galley. In various embodiments, passenger compartment 504 may also include a lavatory.

Figure 6:
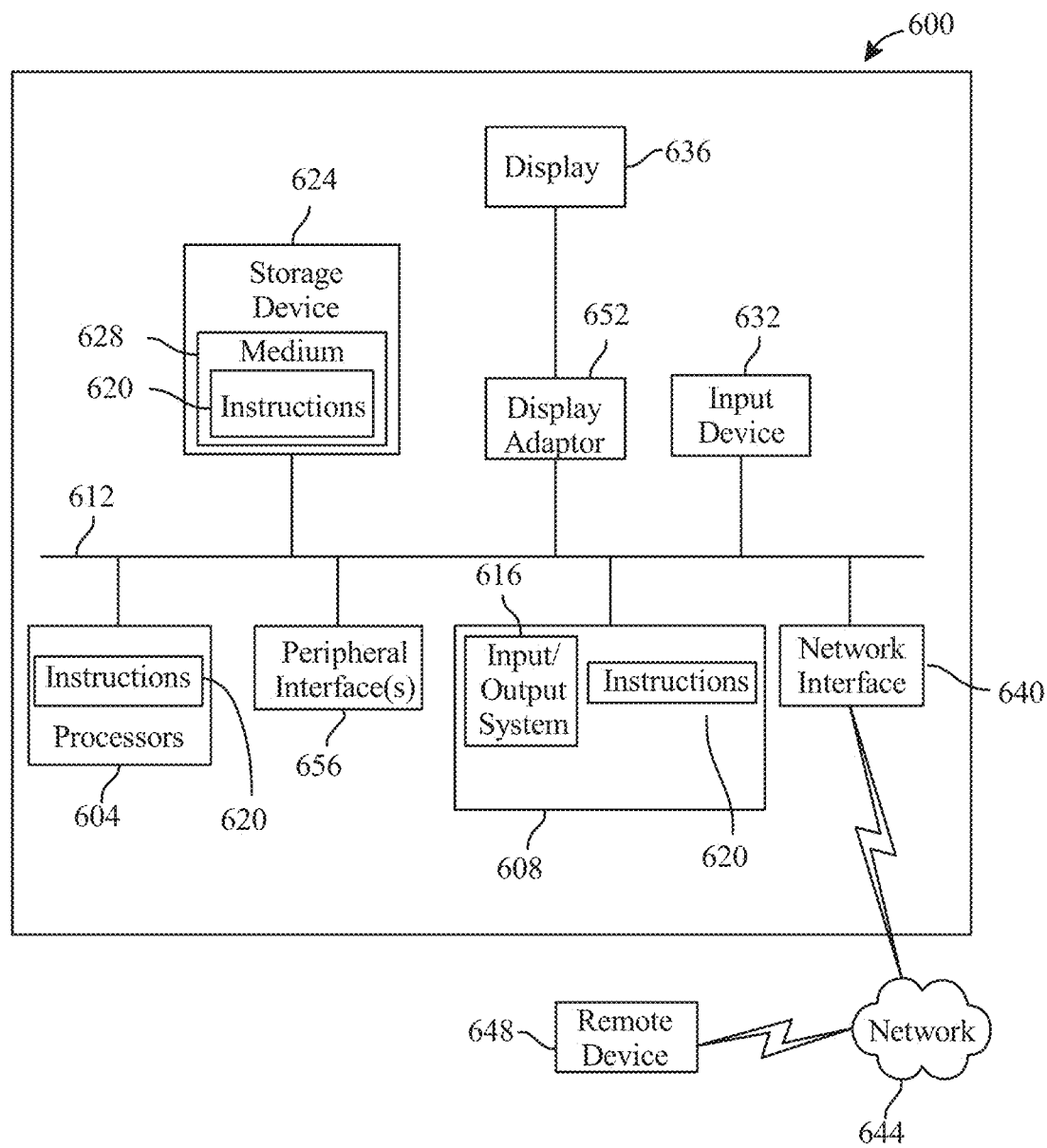
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1396 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A freighter aircraft for long-distance travel, the freighter aircraft comprising:
   a blended wing body having a main body, a transition, and wings with no clear demarcation between the wings and the main body along a leading edge of the freighter aircraft;
   a fuel storage located within the blended wing body, the fuel storage comprising a fuel capacity, wherein the fuel storage comprises a plurality of fuel stores, wherein the plurality of fuel stores contains different types of fuel, and wherein the fuel capacity is configured for long-range flight;
   a cargo bay located within the main body, the cargo bay configured to have a freighter capacity; and
   a cargo loading system comprising a conveyor belt configured to extend from a first location outside the freighter aircraft to a second location inside the cargo bay of the freighter aircraft and move cargo from the first location to the second location, and
   wherein the freighter aircraft is a long-range aircraft, the freighter aircraft configured to provide a ton-miles per sortie between 135,000 and 450,000.

2. The freighter aircraft of claim 1, wherein the fuel storage is located within the transition, wherein the transition increases in chord and thickness moving from the wings in a direction of the main body.

3. The freighter aircraft of claim 2, wherein the fuel storage is further located in the wings.

4. The freighter aircraft of claim 1, wherein the cargo bay is configured to hold passengers and comprises a maximum passenger capacity of between 175 and 350 passengers.

5. The freighter aircraft of claim 1, wherein the main body further comprises a single deck, wherein a cargo compartment and a space to hold one or more passengers are located on or above the single deck.

6. The freighter aircraft of claim 1, wherein the main body comprises more than one deck, wherein a space to hold one or more passengers is located above a cargo compartment.

7. The freighter aircraft of claim 1, wherein the freighter aircraft is configured to provide a range at maximum payload between 3,000 and 6,000 nmi.

8. The freighter aircraft of claim 1, wherein a portion of an outer skin surface of a freighter aircraft skin comprises a carbon fiber material.

9. The freighter aircraft of claim 8, wherein the carbon fiber material comprises a stitched carbon fiber cloth.

10. The freighter aircraft of claim 1, the cargo bay comprising a cargo door, the cargo door located on the leading edge of the main body.

11. The freighter aircraft of claim 1, the freighter aircraft comprising a structural element located within the main body, the structural element extending vertically from a lower surface of the main body toward an upper surface of the main body.

12. The freighter aircraft of claim 1, the freighter capacity including a maximum payload weight between 90,000 and 150,000 lbs.

13. The freighter aircraft of claim 1, wherein the freighter aircraft is configured to provide a ton-miles per sortie between 210,000 to 320,000.

14. The freighter aircraft of claim 1, wherein the cargo bay comprises a passenger compartment, the passenger compartment comprising:
- a sitting area, the sitting area comprising one or more seats;
- a sleeping area, the sleeping area comprising one or more bunks; and
- a partitioning wall, wherein the partitioning wall is configured to at least partially physically divide the sitting area from the sleeping area.

15. The freighter aircraft of claim 14, wherein the passenger compartment is removably attached to the cargo bay.

16. The freighter aircraft of claim 1, the freighter aircraft comprising one or more cargo locks located on a floor of the cargo bay, the one or more cargo locks configured to restrain a container within the freighter aircraft.

17. The freighter aircraft of claim 1, wherein a floor of the cargo bay comprises rollers, the rollers configured for movement of a cargo.

18. The freighter aircraft of claim 1, further configured to provide a fuel burn between 0.2 and 0.6 lbs per ton-nmi.

19. The freighter aircraft of claim 1, further comprising a propulsor, the propulsor located on an upper aft surface of the main body.

20. The freighter aircraft of claim 1, the freighter aircraft further comprising a landing gear system, the landing gear system comprising:
- a nose gear disposed proximate a front of the freighter aircraft, the nose gear controllably movable between a first position in which the nose gear is retracted, and a second position in which the nose gear is extended; and
- a main gear disposed proximate a rear of the freighter aircraft, the main gear controllably movable between a third position, in which the main gear is extended, and a fourth position, in which the main gear is retracted;
- wherein, in a ground position, the nose gear is in the first position and the main gear is in the third position and a fuselage of the freighter aircraft is substantially level with the ground; and
- wherein, in an angle-of-attack (AOA) position, the nose gear is in the second position and the main gear is in the fourth position and the fuselage of the aircraft is rotated to a positive AOA with respect to the ground.

* * * * *